US012734727B2

(12) United States Patent
Almqvist et al.

(10) Patent No.: US 12,734,727 B2
(45) Date of Patent: Sep. 15, 2026

(54) HAND-HELD ELECTRICALLY POWERED DISC CUTTER WITH SPECIFIC MASS RATIOS

(71) Applicant: HUSQVARNA AB, Huskvarna (SE)

(72) Inventors: Torbjörn Almqvist, Gothenburg (SE); Paul Johansson, Torslanda (SE); Hanna Olsson, Kungsbacka (SE)

(73) Assignee: HUSQVARNA AB, Huskvarna (SE)

( * ) Notice: Subject to any disclaimer, the term of this patent is extended or adjusted under 35 U.S.C. 154(b) by 925 days.

(21) Appl. No.: 17/605,896

(22) PCT Filed: Nov. 25, 2020

(86) PCT No.: PCT/SE2020/051123
§ 371 (c)(1),
(2) Date: Oct. 22, 2021

(87) PCT Pub. No.: WO2021/107844
PCT Pub. Date: Jun. 3, 2021

(65) Prior Publication Data

US 2022/0152872 A1 May 19, 2022

(30) Foreign Application Priority Data

Nov. 25, 2019 (WO) ................. PCT/SE2019/051196
Oct. 1, 2020 (WO) ................. PCT/EP2020/077590

(51) Int. Cl.
*B28D 1/04* (2006.01)
*B23D 45/16* (2006.01)
(Continued)

(52) U.S. Cl.
CPC ............. *B28D 1/045* (2013.01); *B23D 45/16* (2013.01); *B23D 57/023* (2013.01); *B25F 5/006* (2013.01);
(Continued)

(58) Field of Classification Search
CPC ............ B25F 5/008; B25F 5/006; B25F 5/02; H01M 10/6556; H01M 10/6563;
(Continued)

(56) References Cited

U.S. PATENT DOCUMENTS 3,192,625 A 7/1965 Mcjohnson
3,643,385 A 2/1972 Mikiya
(Continued)

FOREIGN PATENT DOCUMENTS

CN 101553346 A 10/2009
CN 102114626 A 7/2011
(Continued)

OTHER PUBLICATIONS

International Search Report and Written Opinion for International Application No. PCT/SE2020/051124 mailed Feb. 12, 2021.
(Continued)

*Primary Examiner* — Thomas M Wittenschlaeger
(74) *Attorney, Agent, or Firm* — Burr & Forman

(57) ABSTRACT

A hand-held electrically powered cut-off tool (100, 200, 800, 1000, 1900, 2500) comprising a first part (110) and a second part (120) arranged vibrationally isolated from each other, the first part (110) comprising an interface (2510) for holding a cutting tool (130) and an electric motor (140) arranged to drive the cutting tool, wherein the first part is associated with a first mass (M1), the second part (120) comprising a battery compartment (150) for holding an electrical storage device (220) arranged to power the electric motor (140) as well as front (190) and rear (195) handles for operating the cut-off tool, wherein the second part is associated with a second mass (M2), wherein the electrical storage device (220) is associated with a third mass (M3), and wherein the cutting tool is associated with a fourth mass (M4), wherein a ratio of the second mass (M2) to the sum
(Continued)

of the first and second masses (M1+M2) is at least 0.3, and preferably more than 0.35; wherein a ratio of a sum of the second and the third mass (M2+M3) to the sum of the first and fourth masses (M1+M4) is at least 0.6, and preferably more than 0.8 and even more preferably more than 1.0; wherein a ratio of a sum of the second and the third mass (M2+M3) to the sum of the weight of the entire device including electrical energy storage and cutting disc, is at least 0.45, and preferably more than 0.5.

12 Claims, 19 Drawing Sheets

(51) Int. Cl.

| | |
|---|---|
| ***B23D 57/02*** | (2006.01) |
| ***B25F 5/00*** | (2006.01) |
| ***B25F 5/02*** | (2006.01) |
| ***B26B 25/00*** | (2006.01) |
| ***B27B 17/02*** | (2006.01) |
| ***F16F 7/10*** | (2006.01) |
| ***F16F 15/08*** | (2006.01) |
| ***H01M 10/613*** | (2014.01) |
| ***H01M 10/6235*** | (2014.01) |
| ***H01M 10/6556*** | (2014.01) |
| ***H01M 10/6563*** | (2014.01) |
| ***H01M 10/6566*** | (2014.01) |
| ***H01M 50/244*** | (2021.01) |
| ***H01M 50/247*** | (2021.01) |
| ***H01M 50/262*** | (2021.01) |
| ***H01M 50/296*** | (2021.01) |
| *B28D 1/08* | (2006.01) |
| *F16F 15/04* | (2006.01) |

(52) U.S. Cl.

CPC ................ *B25F 5/008* (2013.01); *B25F 5/02* (2013.01); *B26B 25/00* (2013.01); *B27B 17/02* (2013.01); *F16F 7/1028* (2013.01); *F16F 15/085* (2013.01); *H01M 10/613* (2015.04); *H01M 10/6235* (2015.04); *H01M 10/6556* (2015.04); *H01M 10/6563* (2015.04); *H01M 10/6566* (2015.04); *H01M 50/244* (2021.01); *H01M 50/247* (2021.01); *H01M 50/262* (2021.01); *H01M 50/296* (2021.01); *B28D 1/082* (2013.01); *F16F 15/04* (2013.01); *F16F 2228/007* (2013.01); *H01M 2220/30* (2013.01)

(58) Field of Classification Search

CPC ........... H01M 10/6235; H01M 10/613; H01M 10/6566; H01M 50/262; H01M 50/247; H01M 50/244; H01M 50/296; H01M 2220/30; B23D 57/023; B23D 45/16; B26B 25/00; B28D 1/045; B28D 1/082; B27B 17/02; F16F 15/085; F16F 15/04; F16F 7/1028; F16F 2228/007; Y02E 60/10; B27G 19/04

See application file for complete search history.

(56) References Cited

U.S. PATENT DOCUMENTS

| | | | | |
|---|---|---|---|---|
| 3,652,074 | A | 3/1972 | Frederickson et al. | |
| 3,698,455 | A | 10/1972 | Frederickson et al. | |
| 5,006,740 | A | 4/1991 | Palm | |
| 5,600,542 | A | 2/1997 | Malgouires | |
| 5,632,578 | A | 5/1997 | McCurry et al. | |
| 6,095,270 | A | 8/2000 | Ishikawa | |
| 6,314,922 | B1 | 11/2001 | Zimmermann et al. | |
| 6,376,942 | B1 * | 4/2002 | Burger | H01M 50/247 429/97 |
| 6,894,893 | B2 | 5/2005 | Hidesawa | |
| 7,121,854 | B2 | 10/2006 | Buck et al. | |
| 7,858,219 | B2 | 12/2010 | Agehara et al. | |
| 8,389,143 | B2 | 3/2013 | Roskamp et al. | |
| 8,430,182 | B2 | 4/2013 | Soika et al. | |
| 9,221,111 | B2 | 12/2015 | Elfner et al. | |
| 2002/0043958 | A1 | 4/2002 | Yamaguchi et al. | |
| 2006/0055369 | A1 | 3/2006 | Duesselberg | |
| 2007/0031248 | A1 | 2/2007 | Hsu et al. | |
| 2007/0240313 | A1 | 10/2007 | Layher et al. | |
| 2007/0240892 | A1 | 10/2007 | Brotto et al. | |
| 2008/0290745 | A1 | 11/2008 | Riedl | |
| 2009/0245958 | A1 | 10/2009 | Lau et al. | |
| 2010/0218967 | A1 | 9/2010 | Roskamp et al. | |
| 2010/0221594 | A1 | 9/2010 | Roskamp et al. | |
| 2011/0006621 | A1 | 1/2011 | Lau | |
| 2011/0162209 | A1 | 7/2011 | Wain | |
| 2011/0162219 | A1 * | 7/2011 | Okouchi | B27B 17/00 173/217 |
| 2012/0067608 | A1 | 3/2012 | Heinzelmann et al. | |
| 2012/0186843 | A1 | 7/2012 | Schonfeld et al. | |
| 2012/0302147 | A1 | 11/2012 | Trautner et al. | |
| 2014/0024298 | A1 | 1/2014 | Scholz | |
| 2014/0287857 | A1 | 9/2014 | Doering | |
| 2014/0318821 | A1 | 10/2014 | Wyler et al. | |
| 2015/0303531 | A1 | 10/2015 | Willgert et al. | |
| 2017/0071134 | A1 | 3/2017 | Li et al. | |
| 2017/0120436 | A1 | 5/2017 | Rudolph | |
| 2017/0259359 | A1 | 9/2017 | Kachi et al. | |
| 2017/0326718 | A1 | 11/2017 | Meixner et al. | |
| 2017/0334056 | A1 | 11/2017 | Kawakami et al. | |
| 2017/0365826 | A1 | 12/2017 | Varipatis et al. | |
| 2018/0021866 | A1 | 1/2018 | Ukai et al. | |
| 2018/0099393 | A1 | 4/2018 | Iida et al. | |
| 2018/0250804 | A1 * | 9/2018 | Hoche | A01G 3/053 |
| 2018/0369939 | A1 | 12/2018 | Zimmerman et al. | |
| 2019/0036350 | A1 | 1/2019 | Gleason et al. | |
| 2019/0182965 | A1 | 6/2019 | Zhang et al. | |
| 2019/0305640 | A1 | 10/2019 | Duernegger | |
| 2020/0006021 | A1 | 1/2020 | Lewis et al. | |

FOREIGN PATENT DOCUMENTS

| | | | |
|---|---|---|---|
| CN | 205993049 | U | 3/2017 |
| CN | 108430709 | A | 8/2018 |
| CN | 108527267 | A | 9/2018 |
| CN | 208262766 | U | 12/2018 |
| CN | 110126968 | A | 8/2019 |
| CN | 110602865 | A | 12/2019 |
| DE | 1768076 | U | 6/1958 |
| DE | 19605827 | A1 | 8/1996 |
| DE | 19626254 | A1 | 1/1998 |
| DE | 102007017980 | A1 | 10/2008 |
| DE | 102007039828 | B3 | 11/2008 |
| DE | 202009009145 | U1 | 12/2010 |
| DE | 102015226410 | A1 | 6/2017 |
| DE | 102016106559 | A1 | 10/2017 |
| DE | 102016209637 | A1 | 12/2017 |
| DE | 102019207122 | A1 | 11/2019 |
| EP | 0940864 | A2 | 9/1999 |
| EP | 0945053 | A1 | 9/1999 |
| EP | 1078559 | B1 | 3/2002 |
| EP | 2000267 | A2 | 12/2008 |
| EP | 2404708 | A2 | 1/2012 |
| EP | 2431132 | A2 | 3/2012 |
| EP | 2747949 | B1 | 11/2017 |
| EP | 3369530 | A1 | 9/2018 |
| FR | 2254943 | A5 | 7/1975 |
| FR | 3013250 | A1 | 5/2015 |
| GB | 2319669 | A | 5/1998 |
| GB | 2352997 | A | 2/2001 |
| GB | 2423420 | A | 8/2006 |
| GB | 2432036 | A | 5/2007 |
| GB | 2449444 | A | 11/2008 |
| JP | S56163721 | U | 12/1981 |
| JP | H0662637 | A | 3/1994 |
| JP | H09226382 | A | 9/1997 |

(56) References Cited

FOREIGN PATENT DOCUMENTS

| | | | |
|---|---|---|---|
| JP | 11213970 | A | 8/1999 |
| JP | 2007320004 | A | 12/2007 |
| JP | 2011-136541 | A | 7/2011 |
| JP | 2014018887 | A | 2/2014 |
| JP | 2014151415 | A | 8/2014 |
| JP | 2015013369 | A | 1/2015 |
| JP | 2018187699 | A | 11/2018 |
| JP | 2018187702 | A | 11/2018 |
| TW | 201208813 | A | 3/2012 |
| WO | 2009145206 | A2 | 12/2009 |
| WO | 2011124700 | A2 | 10/2011 |
| WO | 2012002860 | A1 | 1/2012 |
| WO | 2013032372 | A1 | 3/2013 |
| WO | 2013032375 | A1 | 3/2013 |
| WO | 2013062457 | A1 | 5/2013 |
| WO | 2013139372 | A1 | 9/2013 |
| WO | 2013187837 | A2 | 12/2013 |
| WO | 2014062105 | A1 | 4/2014 |
| WO | 2014126017 | A1 | 8/2014 |
| WO | 2015139723 | A1 | 9/2015 |
| WO | 2016013398 | A1 | 1/2016 |
| WO | 2016052266 | A1 | 4/2016 |
| WO | 2016083555 | A1 | 6/2016 |
| WO | 2016087341 | A1 | 6/2016 |
| WO | 2017083405 | A1 | 5/2017 |
| WO | 2017159201 | A1 | 9/2017 |
| WO | 2018180084 | A1 | 10/2018 |
| WO | 2019109279 | A1 | 6/2019 |
| WO | 2020043707 | A1 | 3/2020 |

OTHER PUBLICATIONS

Search Report and Office Action for Swedish Application No. 1951339-9 mailed Aug. 5, 2020.

Search Report and Office Action for Swedish Application No. 1951340-7 mailed Aug. 5, 2020.

Search Report and Office Action for Swedish Application No. 1951341-5 mailed Aug. 5, 2020.

International Search Report and Written Opinion for International Application No. PCT/SE2019/051196 mailed Aug. 5, 2020.

Search Report and Office Action for Swedish Application No. 2050059-1 mailed Sep. 4, 2020.

International Search Report and Written Opinion for International Application No. PCT/EP2020/077590 mailed Dec. 17, 2020.

International Search Report and Written Opinion for International Application No. PCT/SE2020/051121 mailed Jan. 19, 2021.

International Search Report and Written Opinion for International Application No. PCT/SE2020/051128 mailed Jan. 22, 2021.

International Search Report and Written Opinion for International Application No. PCT/SE2020/051125 mailed Feb. 9, 2021.

International Search Report and Written Opinion for International Application No. PCT/SE2020/051127 mailed Feb. 24, 2021.

International Search Report and Written Opinion for International Application No. PCT/SE2021/050014 mailed Mar. 5, 2021.

International Search Report and Written Opinion for International Application No. PCT/SE2020/051122 mailed Mar. 3, 2021.

International Search Report and Written Opinion for International Application No. PCT/SE2020/051123 mailed Mar. 12, 2021.

Search Report and Office Action for Swedish Application No. 2051131-7 mailed Apr. 23, 2021.

Intention to Grant issued in corresponding European Patent Application No. 20 892 927.3 mailed Jan. 29, 2025, all pages cited in its entirety.

* cited by examiner 700
750
150
730
710
701
740
720
770
760
220

700
150
750
220
730
710
770
740
760
720
701

780
150
S2
S1
702
700
220
730
770
710
720
795
703

A-A

HAND-HELD ELECTRICALLY POWERED DISC CUTTER WITH SPECIFIC MASS RATIOS

TECHNICAL FIELD

The present disclosure relates to electrically powered hand-held work equipment such as cut-off tools and saws for cutting concrete and stone.

BACKGROUND

Hand-held work tools for cutting and/or abrading hard materials such as concrete and stone comprise powerful motors in order to provide the required power for processing the hard materials. These motors generate a substantial amount of heat and therefore need to be cooled in order to prevent overheating. Electrical work tools generate heat by the electrical motor, and also by the battery and control electronics. There is a need for efficient methods of cooling such work tools.

The work tools also normally generate vibration which may be harmful or at least cause discomfort to an operator of the tool. It is desired to protect the operator from prolonged exposure to strong vibration.

The environments in which these types of tools are used are often harsh. The work tools are exposed to water, dust, debris, and slurry, which may affect tool performance negatively. For instance, slurry may accumulate in the work tool interior where it eventually causes tool failure. It is desired to prevent accumulation of dust and slurry in the work tool interior.

Ease of operation is especially important for work tools used on construction sites. For electrical work tools, it is desirable that in-field battery change can be made in an efficient and convenient manner where the battery is easy to insert in the work tool, where the battery is snugly held in the work tool, and where the battery is easily released from the work tool.

To summarize, there are challenges associated with hand-held work tools.

SUMMARY

It is an object of the present disclosure to provide improved hand-held work tools which address the above-mentioned issues.

This object is at least in part obtained by a hand-held electrically powered cut-off tool comprising a first part and a second part arranged vibrationally isolated from each other. The first part comprises an interface for holding a cutting tool and an electric motor arranged to drive the cutting tool, wherein the first part is associated with a first mass M1. The second part comprises a battery compartment for holding an electrical storage device arranged to power the electric motor as well as front and rear handles for operating the cut-off tool, wherein the second part is associated with a second mass M2.

A ratio of the second mass M2 to the sum of the first and second masses M1+M2, i.e., M2/(M1+M2) is at least 0.3, and preferably more than 0.35.

A ratio of a sum of the second and the third mass M2+M3 to the sum of the first and fourth masses M1+M4 is at least 0.6, and preferably more than 0.8 and even more preferably more than 1.0.

A ratio of a sum of the second and the third mass M2+M3 to the sum of the weight of the entire device including electrical energy storage and cutting disc, is at least 0.45, and preferably more than 0.5.

This weight ratios provide a work tool with excellent stability and superior vibration suppression performance, at the same time as an efficient cutting operation is ensured.

Further advantages are obtained by the features set out in the dependent claims.

Generally, all terms used in the claims are to be interpreted according to their ordinary meaning in the technical field, unless explicitly defined otherwise herein. All references to “a/an/the element, apparatus, component, means, step, etc.” are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
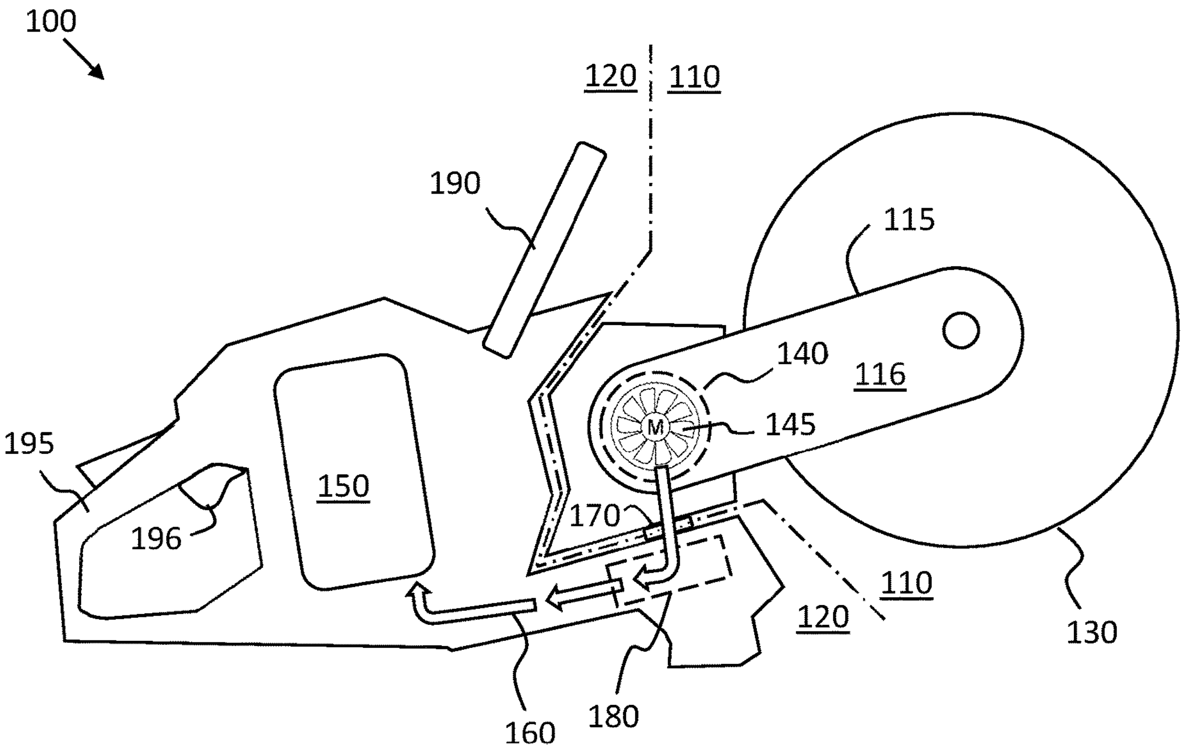
FIG. 1 shows an example work tool.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows a hand-held work tool 100. The work tool 100 in FIG. 1 comprises a rotatable circular cutting tool 130, but the techniques disclosed herein can also be applied to other cutting tools such as chain-saws, core drills, and the like. An electric motor 140 is arranged to drive the cutting tool. This motor is powered from an electrical energy storage device which is arranged to be held in a battery compartment 150.

The electrical motor generates a substantial amount of heat during operation. To prevent the motor from overheating, a fan 145 is arranged to be driven by the motor 140. This fan may, e.g., be attached directly to the motor axle, or by some means of transmission arrangement. The fan generates an airflow which transports heat away from the electric motor, thereby cooling the motor.

The work tool 100 is arranged to be held by a front handle 190 and a rear handle 195 and operated by a trigger 196 in a known manner. It is desirable to minimize vibration in the handles and trigger, since excessive vibration may be uncomfortable for an operator using the work tool 100. Excessive vibration may also reduce the lifetime of tool components such as cable connections and electronics. To reduce these vibrations, the work tool 100 comprises a first part 110 and a second part 120 arranged vibrationally isolated from each other. The first part 110 comprises an interface for holding the cutting tool 130 and also comprises the electric motor 140 arranged to drive the cutting tool. Thus, the first part comprises the main vibration generating elements of the work tool.

Notably, the second part 120 comprises the handles 190, 195 and the trigger 196 and therefore is the part which interfaces with the operator of the work tool 100. The second part 120 also comprises the battery compartment 150 for holding the electrical storage device, and the control electronics for controlling various operations of the work tool 100.

Since vibration generated in the first part 110 is not transferred, or at least not transferred in a significant amount, to the second part 120, an operator of the device 100 will not be subjected to the vibration, which is an advantage since he or she may be able to work for a longer period of time under more comfortable work conditions.

Vibration is normally measured in units of $m/s^2$, and it is desired to limit tool vibration in front and rear handles below 2.5 $m/s^2$. Tool vibration, guidelines for limiting tool vibration, and measurement of the tool vibration are discussed in "VIBRATIONER—Arbetsmiljöverkets föreskrifter om vibrationer samt allmänna råd om tillämpningen av föreskrifterna", Arbetsmiljöverket, A F S 2005:15.

According to some aspects, the work tool 100 comprises a first part 110 and a second part 120 arranged vibrationally isolated from each other by a vibration isolation system arranged to limit front and rear handle vibration to values below 2.5 $m/s^2$.

A cooling air conduit is arranged to guide a portion of the flow of cooling air 160 from the first part 110 and into the second part 120 for cooling the electrical storage device. This means that the fan 145 is used to cool both the electrical motor 140, and the electrical energy source, which is an advantage since only a single fan is needed.

Herein, a conduit is a passage arranged to guide a flow, such as a flow of air. A cooling air conduit may be formed as part of an interior space enclosed by work tool body parts, or as a hose of other type of conduit, or as a combination of different types of conduits.

Any control electronics comprised in the second part 120 may also be arranged to be cooled by the portion of the flow of cooling air 160 which is guided from the first part 110 and into the second part 120. FIG. 1 schematically shows a cooling flange 180 associated with such control electronics, which cooling flange 180 is optional, i.e., the portion of the flow of cooling air can be used to cool the control unit directly in which case the control unit constitutes the cooling flange. Thus, optionally, the portion of the flow of cooling air 160 from the first part 110 and into the second part 120 is arranged to pass a cooling flange 180 associated with a control unit of the hand-held work tool 100.

It may be a challenge to efficiently guide the portion of air 160 from the first part and into the second part, at least partly since the first part and the second part are arranged vibrationally isolated from each other. Some aspects of the disclosed work tool solve this challenge by providing bellows or some other type of flexible air flow conduit between the first part and the second part to guide the portion of air from the fan 145 towards the battery compartment 150. These bellows 170 will be discussed in more detail below in connection to FIGS. 4-6. Bellows are sometimes also referred to as flexible covers, convolutions, accordions, or machine way covers. A hose formed in a flexible material may be used instead of the bellows.

To summarize, FIG. 1 schematically illustrates a hand-held work tool 100 comprising a first part 110 and a second part 120 arranged vibrationally isolated from each other. According to some aspects, the first part 110 is vibrationally isolated from the second part 120 by one or more resilient elements.

The hand-held work tool may be a cut-off tool as shown in FIG. 1, but it can also be a chain saw or other work tool for cutting hard materials. The first part comprises an interface for holding a cutting tool 130 and an electric motor 140 arranged to drive the cutting tool. The drive arrangement may, e.g., comprise a belt drive or a combination of belt drive and geared transmission. The electric motor 140 is arranged to drive a fan 145 configured to generate a flow of cooling air for cooling the electric motor 140. The fan may, e.g., be directly connected to the electric motor shaft, or it can be indirectly connected to the motor shaft via some sort of transmission or drive arrangement, like a belt drive or a geared transmission.

The second part 120 comprises a battery compartment 150 for holding an electrical storage device arranged to power the electric motor 140, and a cooling air conduit is arranged to guide a portion of the flow of cooling air 160 from the first part 110 and into the second part 120 for cooling the electrical storage device. The electrical energy source may be a battery, or some type of fuel-cell or the like.

Figure 2A:
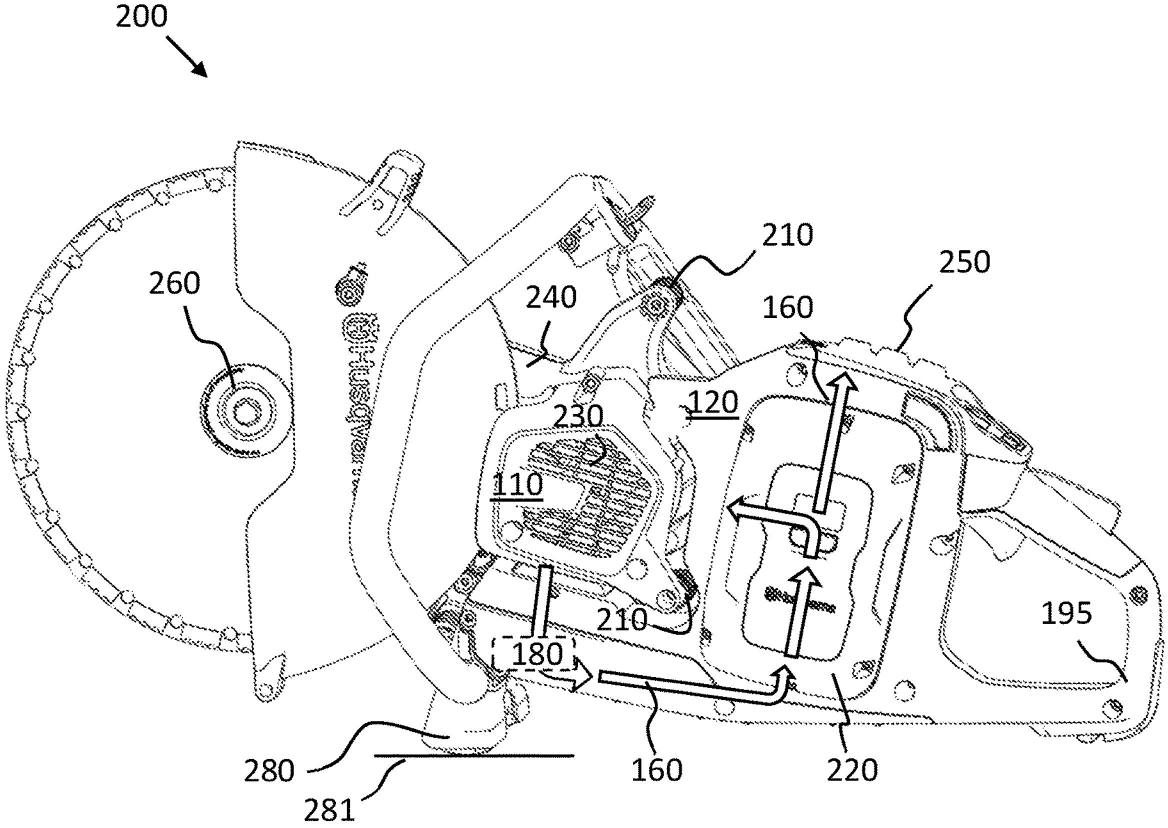
FIGS. 2A-C show views of another example work tool.
Figure 2B:
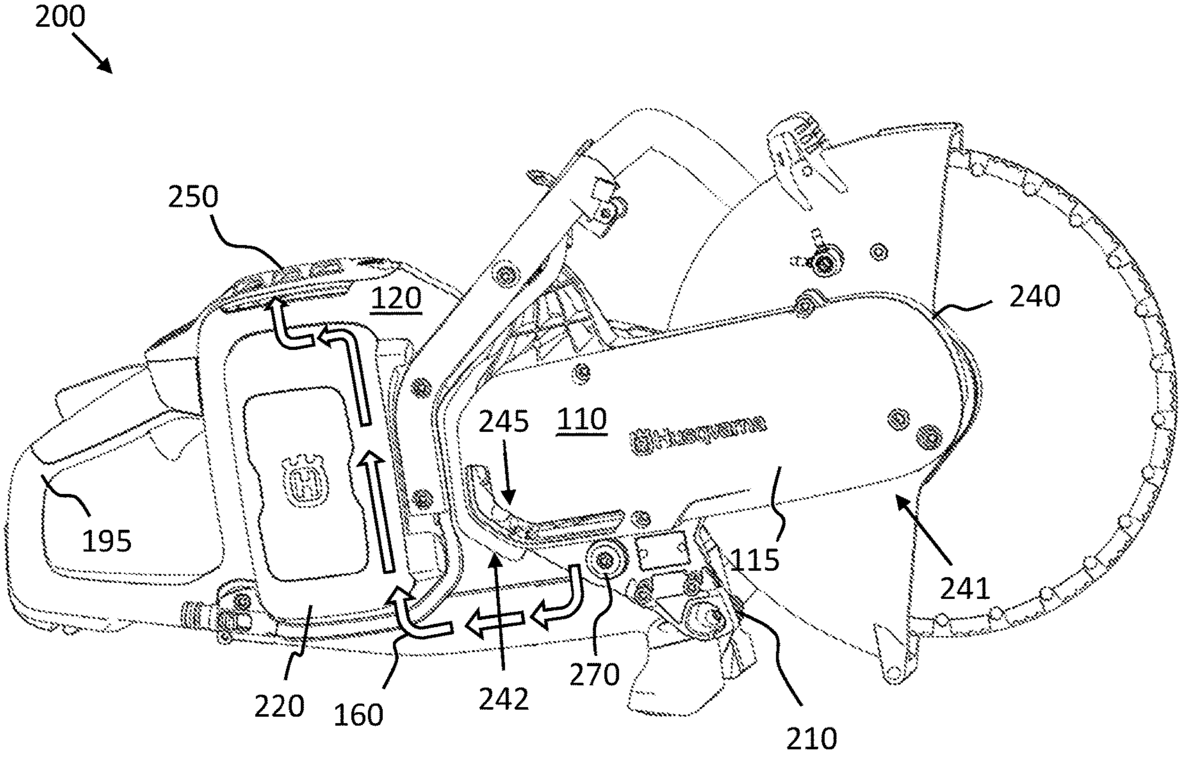
Figure 2C:
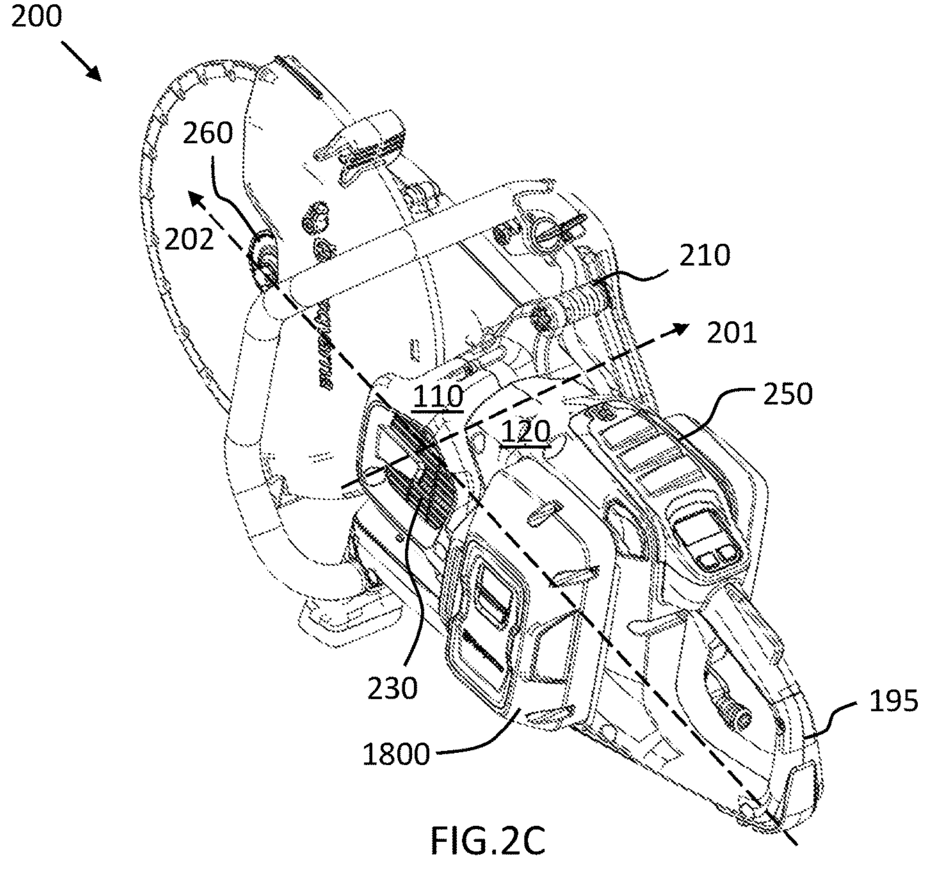

FIGS. 2A-C show different views of an example hand-held work tool 200 arranged to hold a cutting tool by a cutting tool interface 260. The resilient elements separating the first part 110 from the second part 120 are here compression springs 210. However, as mentioned above, some type of resilient material members, such as rubber bushings, may also be used as an alternative to the springs or in combination with the springs. Leaf springs may also be an option for vibrationally isolating the first part 110 from the second part 120.

FIG. 2B shows a holder 270 for an extra blade bushing. Cutting discs may have varying dimensions when it comes to the central hole in the blade. Some blade holes are 20 mm across, while some other holes are 25.5 mm across. There are even some markets where blade central holes of 30.5 mm are common. To allow use with different types of blades, having different dimensions on the central blade hole, the hand-held work tool 200 comprises a holder 270 arranged on the work tool body for holding a blade bushing. This extra blade bushing preferably has a different dimension compared to the blade bushing mounted in connection to the cutting tool interface 260.

FIG. 2A shows an example electrical storage device 220, here a battery, fitted in the battery compartment 150. This battery may be held in position by means of a battery lock mechanism which will be discussed in more detail below in connection to FIGS. 7A-C, 8, and 9. Other types of electrical energy sources which can be used together with the herein disclosed devices and techniques include, e.g., fuel cells, super-capacitors, and the like.

According to some aspects, the flow of cooling air for cooling the electric motor 140 extends transversally 230, 245, 201 through the hand-held work tool, with respect to an extension plane of the circular cutting tool 130. Here, with reference to FIG. 2C, transversally is to be interpreted relative to an extension direction 202 of the work tool extending from the rear handle 195 towards the cutting tool and in relation to an extension plane of the cutting tool 130 (which is more or less vertical in FIG. 2C). Air from the environment is sucked into the work tool interior via an air intake 230 on one side of the tool and at least partly pushed out from the work tool interior via a first air outlet 245 on the other side of the tool formed in a direction transversal from the air intake 230.

A portion of the air flow sucked into the work tool via the air inlet 230 is guided via an air conduit into the second part 120 where it is used to cool the electrical storage device and optionally also cool portions of electrical control circuitry. With reference to, e.g., FIG. 2B, this portion of the air flow is guided downwards from the fan and then backwards in the tool towards the battery compartment 150 before it exits the work tool via a second air outlet 250 formed in the second part 120 of the tool.

It is appreciated that the air flow can be directed also in the reverse direction if the fan is run in reverse. I.e., the air outlets 245, 250 can also be used to suck cool air from the environment into the work tool 100, 200, and the air intake 230 can be re-purposed to instead allow hot air to exit the work tool.

Figure 10A:
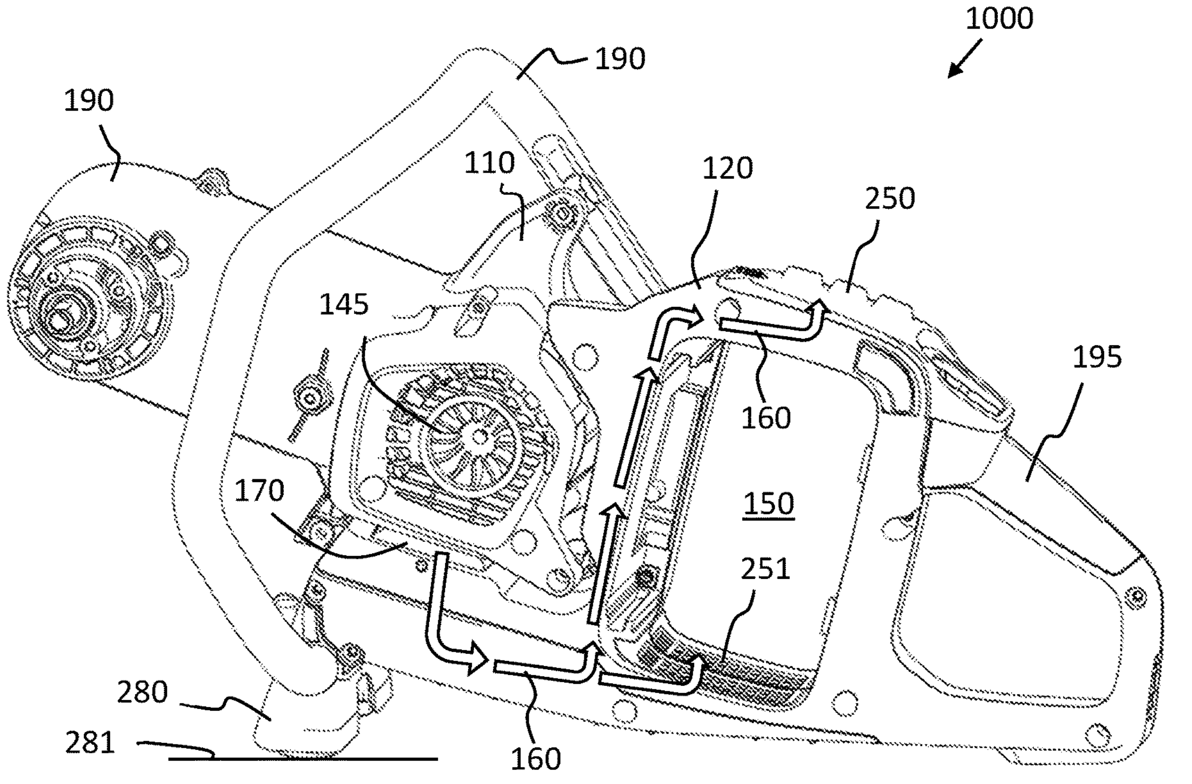
FIGS. 10A-C show views of an example work tool.

With reference to FIG. 10A, the portion of the air flow 160 guided downwards from the fan and then backwards in the tool also exits the work tool via a third air outlet 251 formed inside the battery compartment 151. This third outlet is mainly arranged to cool a battery received in the battery compartment 150.

Figure 3A:
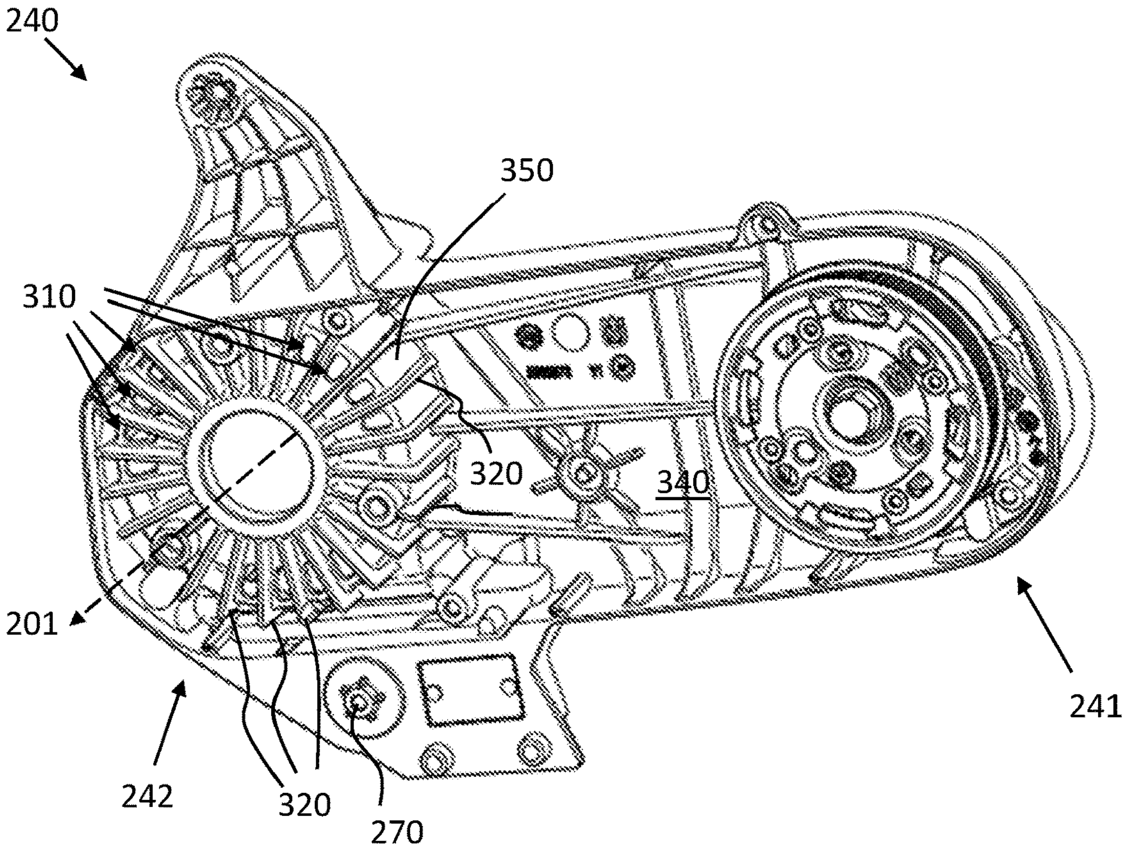
FIGS. 3A-B show views of a work tool support arm.
Figure 3B:
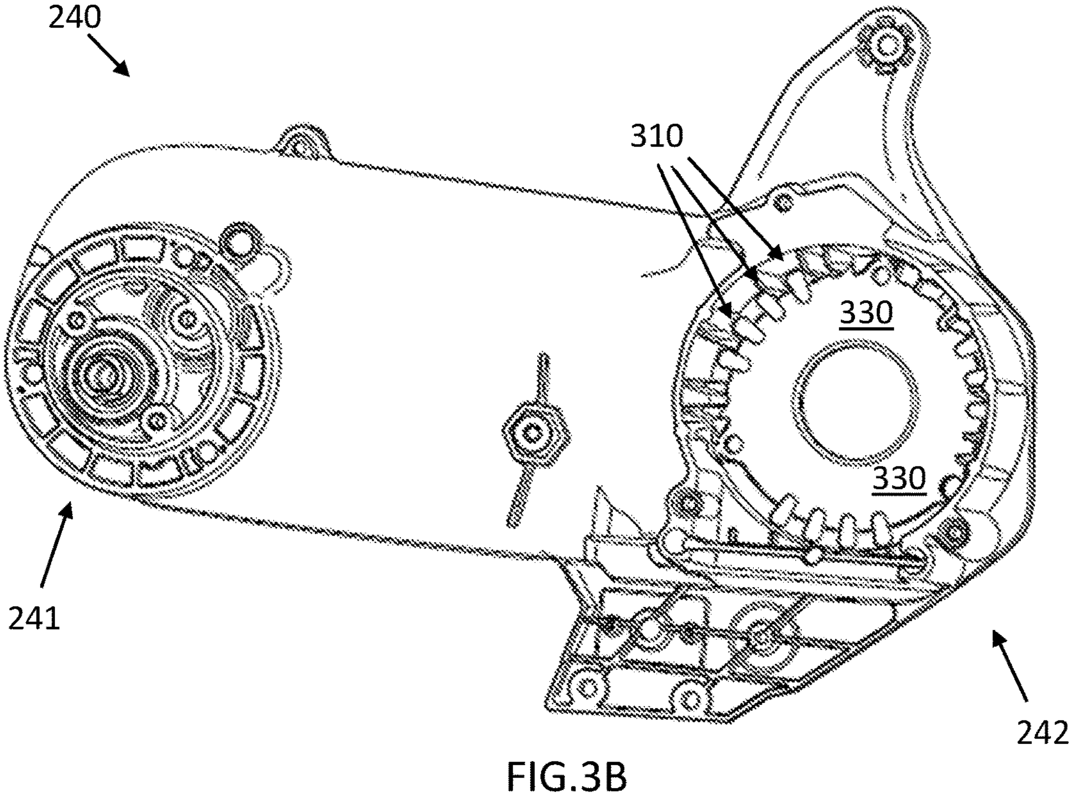

FIGS. 3A and 3B illustrates some aspects of the disclosed work tool, wherein the first part 110 comprises a thermally conductive support arm 240 arranged to support the circular cutting tool 130 on a first end of the support arm 241, and to support the electric motor 140 by a support surface 330 at a second end of the support arm 242 opposite to the first end 241. The motor 140 is then arranged to drive the cutting tool via some type of drive arrangement, such as a belt drive or a combination of belt drive and geared transmission. The belt is not shown in FIG. 3A, only the belt pulley. The support surface 330 represents a relatively large interfacing area between the motor 140 and the support arm 240, which allows for a significant amount of heat transfer from the motor and into the support arm material, at least if the electric motor comprises a corresponding surface for interfacing with the support surface. This heat is then dissipated from one or more cooling flanges 320 formed on the support arm 240. Thus, the support arm 240 comprises one or more cooling flanges 320 arranged to dissipate heat away from the electric motor 140 via the support surface 330.

The support arm 240 is an arm of the cut-off tool, it may equivalently be referred to as a cut-off arm 240.

This heat transfer arrangement improves the heat dissipation from the motor since the cooling air flow is more efficiently utilized to transport the heat away from the motor.

The more thermally conductive the support arm is, the more efficient is the heat dissipation. According to some aspects, at least some parts of the support arm is formed in a material having a thermal conductivity property above 100 Watts per meter and Kelvin (W/mK). For instance, at least some parts of the support arm may be formed in aluminum, which has a thermal conductivity of about 237 W/mK. Iron or steel is another option which would provide the desired thermal conductivity. The support arm may also be formed in different materials, i.e., one highly thermally conductive material such as copper, magnesium or aluminum can be used for the cooling flanges and another material, such as cast iron or steel, to provide general structural support.

Figure 14A:
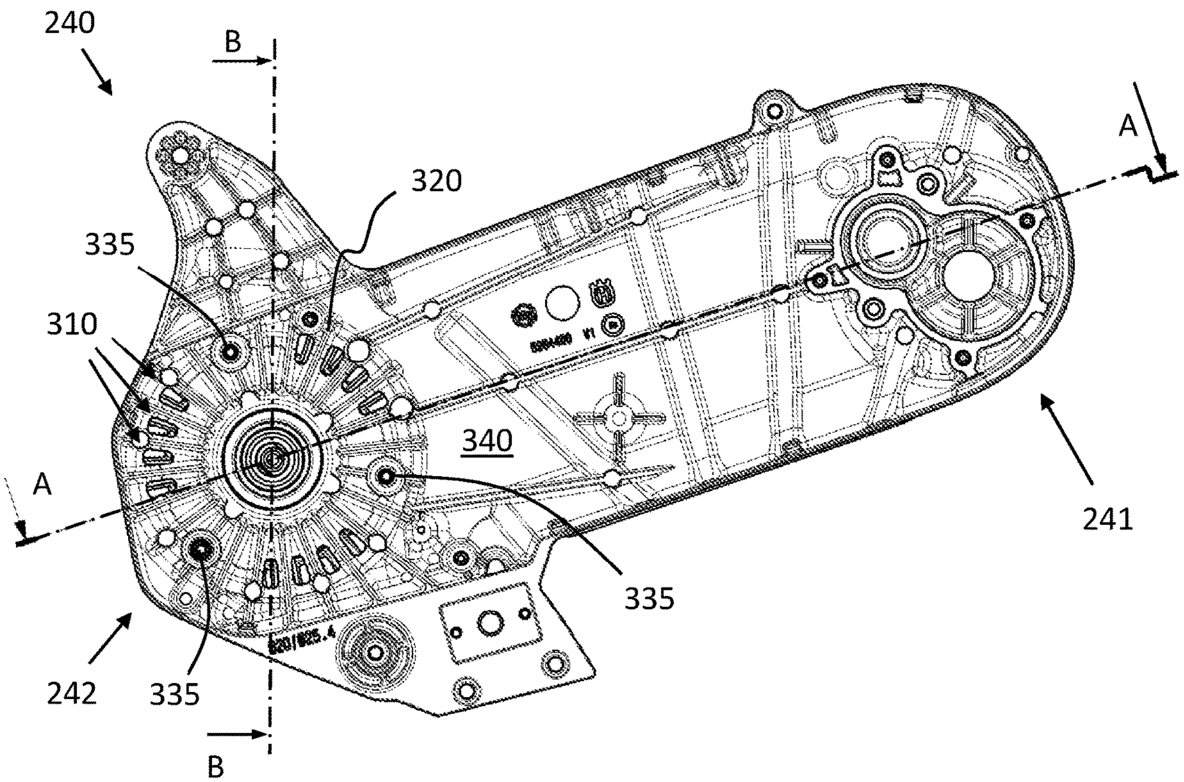
FIGS. 14A-C show details of a work tool support arm.
Figure 14B:
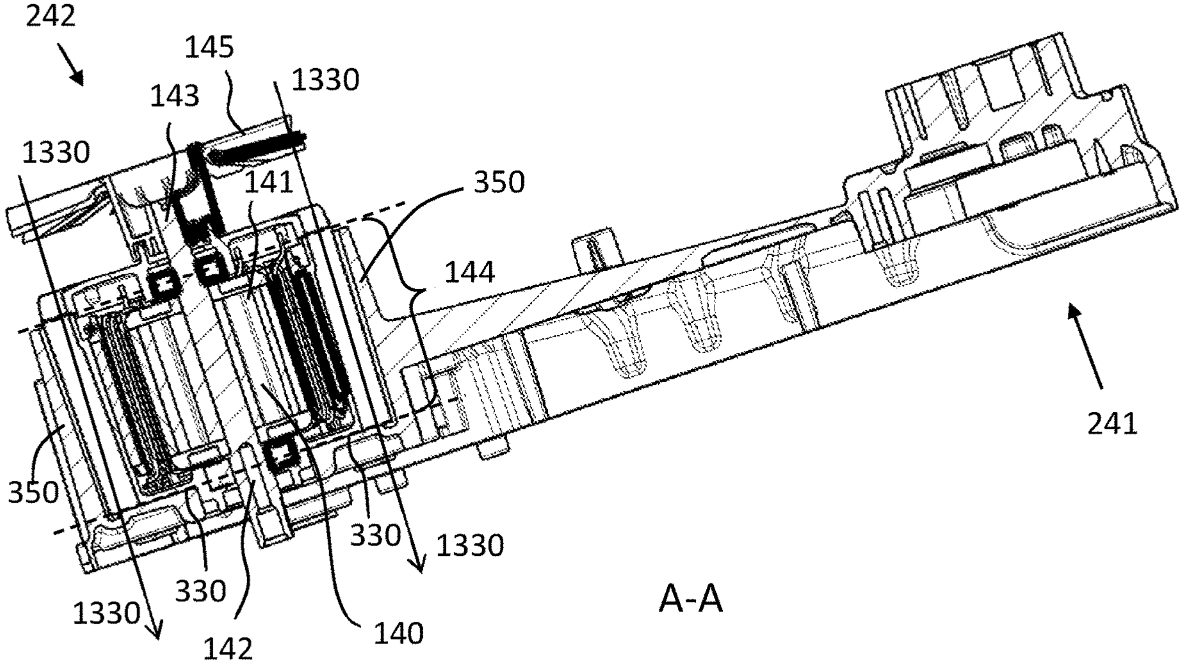
Figure 14C:
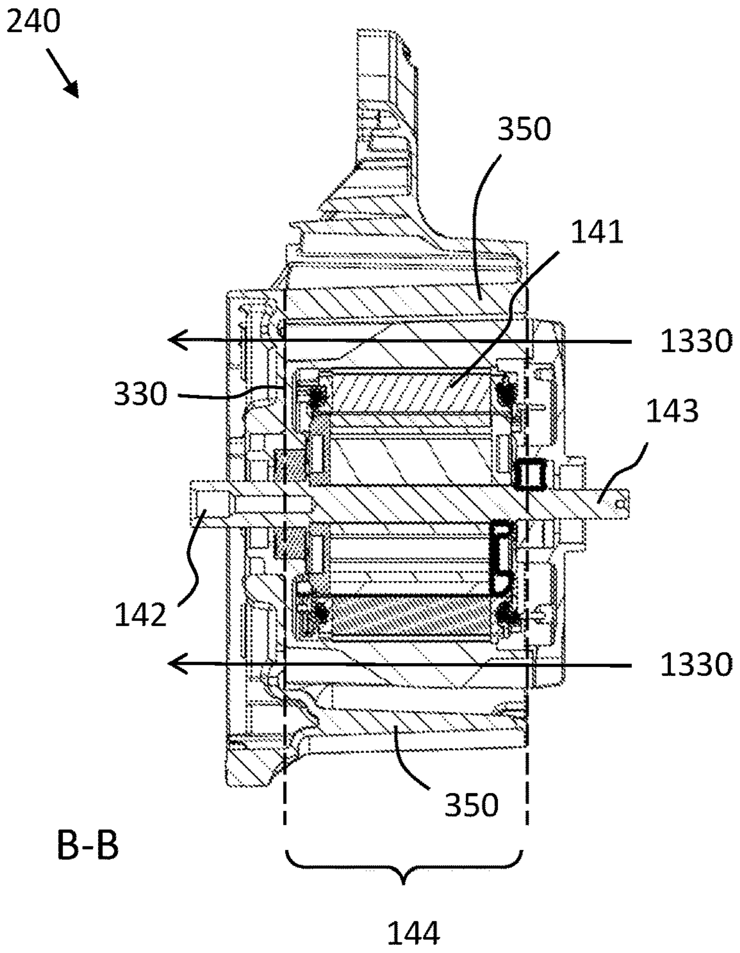

FIGS. 14A-14C and FIG. 15 show details of an example support arm 240 arranged to support the circular cutting tool 130 on a first end of the support arm 241, and to support the electric motor 140 by a support surface 330 at a second end of the support arm 242 opposite to the first end 241. FIG. 14A shows a view of the support arm 240 and the interior space 340 discussed above. FIG. 14B shows a first cross-sectional view along line A-A and FIG. 14C shows a second cross-sectional view along line B-B. The motor 140 comprises a motor axle extending through the motor housing 141 in a known manner.

Figure 15:
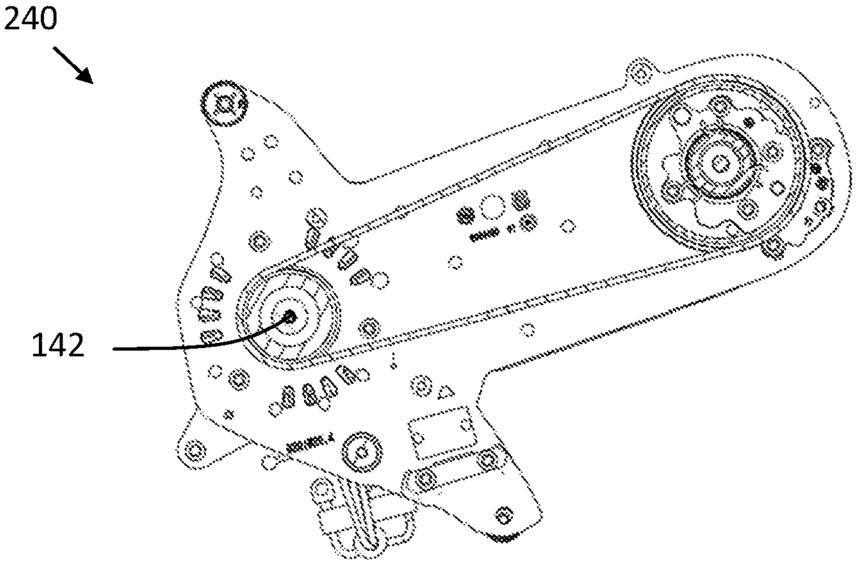
FIG. 15 illustrates a drive arrangement for driving a circular cutting tool.

A first end 142 of the axle is arranged to hold a pulley for driving the circular cutting tool 130. FIG. 15 shows a view of the support arm 240 with the drive pulleys and the drive belt in place to drive the circular cutting tool 130.

A second end 143 of the motor axle is arranged to drive the fan 145. The example fan 145 shown in FIG. 14B is a regular axial fan. Another more advanced example of the fan 145 will be discussed below in connection to FIGS. 11-13.

Optionally, the support arm 240 is arranged to enclose the electric motor at least partially 140, thereby protecting the motor and improving the cooling efficiency of the air flow 1330 past the motor. Towards this end, the support arm 240 comprises a cup-shaped recess, seen in detail in FIG. 10C, where the support surface 330 makes up the bottom portion of the recess and a cylinder shaped wall 350 extends out from a perimeter of the support surface 330 to enclose the motor housing 141 of the electric motor 140 when the motor is supported on the support surface 330. The motor 140 is arranged to be firmly bolted onto the support surface 330 through bolt holes 335, thereby ensuring good thermal conduction between the motor 140 and the support arm 240 as well as mechanical integrity. A slot is formed between the cylinder shaped wall 350 and the motor 140, i.e., the recess wall 350 is distanced radially from the motor housing. This slot is arranged to guide a flow of cooling air 1330 from the fan 145 past the motor 140. The flow 1330 extends transversally from the fan 145 through the support arm 240 to cool the electric motor 140. The flow of cooling air 1330 then passes through the openings 310 and into the interior space 340 and then out via the first air outlet 245 shown in FIG. 2B.

According to some aspects, at least 30% of a volume of the electric motor 140, i.e., the volume of the electric motor including its housing 141, is enclosed by the support arm 240. This means that the cylinder shaped wall 350 extends a distance 144 from the support surface 330 to enclose at least 30% of the volume of the motor housing 141. Thus, the motor is optionally significantly embedded into the support arm, or even entirely embedded as shown in FIGS. 14A-14C, thereby improving both structural integrity of the motor and support arm assembly, as well as improving heat transport away from the electric motor. The cooling of the electric motor 140 is also improved by the slot formed between the cylinder shaped wall and the electric motor housing, which cooperates with the thermally conductive support arm and the cooling flanges to cool the motor efficiently.

The support arm 240 and the electric motor 140 may also be at least partially integrally formed. This means that some parts of the electric motor 140 may be shared with the support arm 240. For instance, a part of the support arm 240 may constitute part of the electric motor housing, such as a motor gable facing the support arm. The common part shared between the support arm 240 and the electric motor 140 may, e.g., be machined or molded. Also, optionally, the electric motor axle may bear against a surface of the support arm, to improve mechanical integrity.

It is noted that the feature of an at least partially integrally formed support arm and electric motor can be advantageously combined with the other features disclosed herein but is not dependent on any of the other features disclosed herein. Thus, there is disclosed herein a support arm 240 and electric motor 140 assembly for a work tool 100, where the support arm and the electric motor are at least partially integrally formed.

With reference to FIG. 2B, the first part 110 optionally comprises a belt guard 115 configured to enclose the interior space 340. As discussed above, a portion of the flow of cooling air is arranged to be guided into the interior space 340, thereby increasing an air pressure in the belt guard 115 interior space 340 above an ambient air pressure level. The interior space 340 is delimited on one side by the support arm (discussed below in connection to FIGS. 3A and 3B), and on the other side by the belt guard 115, which assumes the function of a lid arranged to engage the support arm to protect the drive belt among other things. The belt guard 115 comprises an air outlet 245 through which the flow of cooling air exits the interior space. This air outlet 245 is configured with an area such that the air pressure in the belt guard 115 interior space 340 increases above the ambient air pressure level by a desired amount.

The increase in air pressure in the interior space 340 means that a flow of air will exit through all openings into the interior space 340, i.e., any cracks and the like, and not just the air outlet 245. This in turn means that water, dust, debris, and slurry will have to overcome this flow of air in order to enter into the interior. Thus, accumulation of unwanted material inside the work tool is reduced.

Water inside the interior space 340 may cause the belt drive to slip and is therefore undesirable. The increase in air pressure in the belt guard 115 interior space 340 means that less water is able to enter the interior space, which is an advantage. As a consequence, requirements on the belt can be reduced, such that, e.g., belts with a smaller number of ribs can be used.

Figure 4:
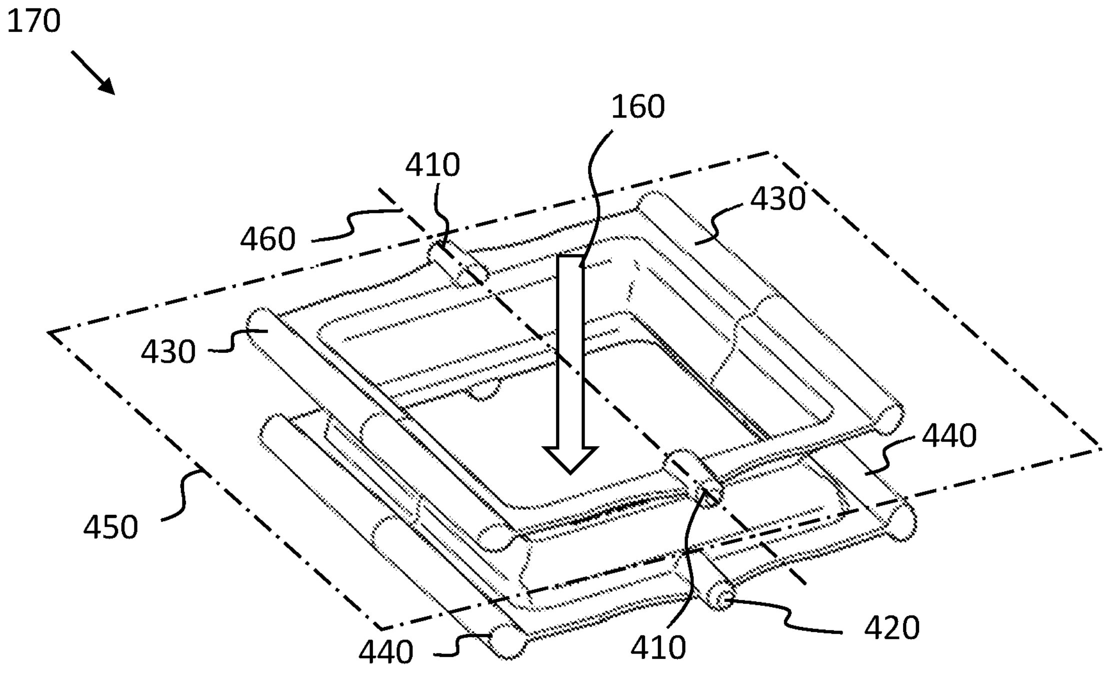
FIGS. 4-6 illustrate bellows for guiding an air flow.

As noted above, the portion of the flow of cooling air 160 guided from the first part 110 and into the second part 120 may pass via a bellows or other flexible air flow conduit 170 arranged in-between the first 110 and the second 120 parts. FIG. 4 shows an example of such bellows 10 in detail.

According to some aspects, the bellows 170 is associated with a Shore durometer value, or Shore hardness, between 10-70, and preferably between 50-60, measured with durometer type A according to DIN ISO 7619-1.

The bellows 170 optionally comprises a poka-yoke feature 410, 420. This poka-yoke feature comprises at least one protrusion 410, 420 configured to enter a corresponding recess formed in the first part 110 and/or in the second part 120, thereby preventing erroneous assembly of the bellows with the first 110 and second 120 parts.

Figure 5:
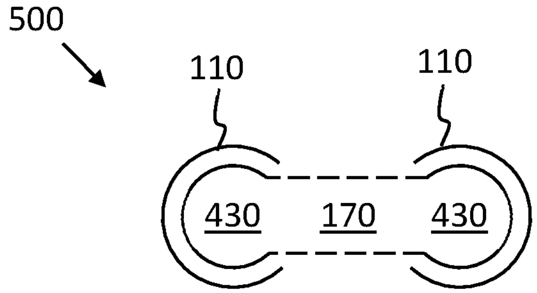
Figure 6:
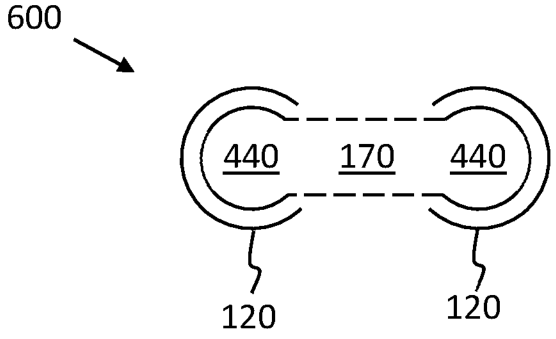

The bellows 170 also optionally comprises at least one edge portion 430, 440 of increased thickness. Each such edge portion is arranged to enter a corresponding groove formed in the first part 110 or in the second part 120, thereby fixing the bellows 170 in relation to the first or second part similar to a sail leech fitting into a mast. FIGS. 5 and 6 schematically illustrate a bellows fitted onto the first and second parts, respectively, by the edge portions.

The bellows illustrated in FIG. 4 is arranged with a shape that is symmetric about a symmetry plane 450 parallel to an extension direction of the edge portions 430, 440. Thus, advantageously, the bellows can be assembled with the first and second parts independently of which side of the bellows that is facing upwards. I.e., the bellows can be rotated 180 degrees about the symmetry axis 460 and assembled with the first and second parts.

Figure 7A:
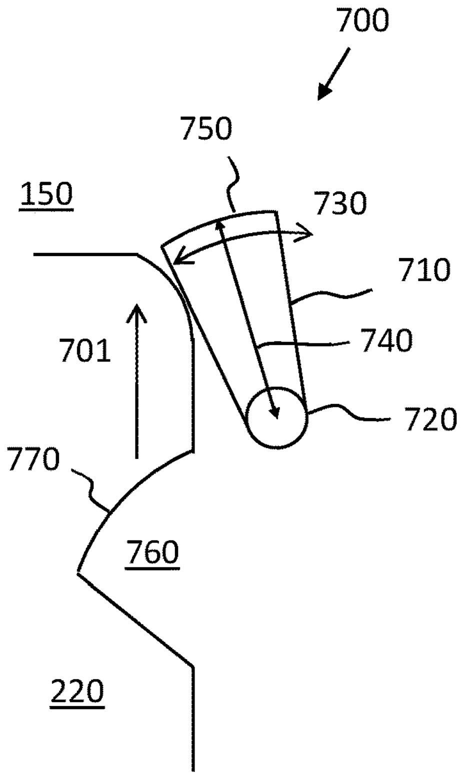
FIGS. 7A-C schematically illustrate a locking mechanism.
Figure 7B:
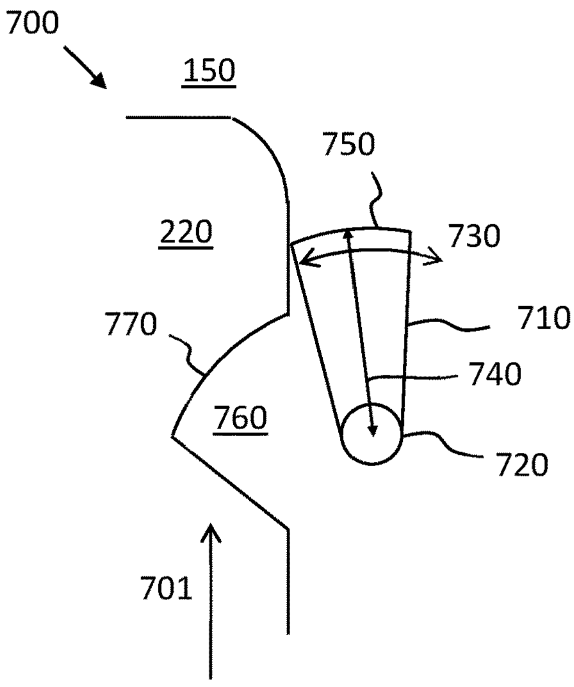
Figure 7C:
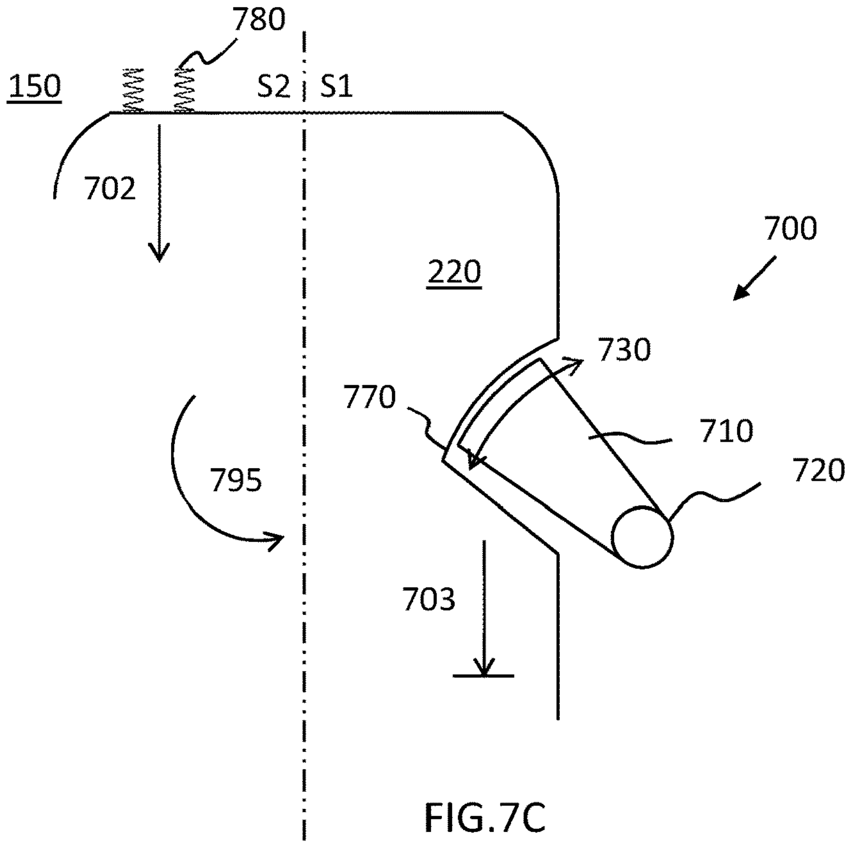

FIGS. 7A-C schematically illustrate aspects of the battery compartment 150, where the battery compartment comprises a battery lock mechanism 700. The battery lock mechanism comprises a locking member 710 rotatably supported on a shaft 720. The locking member comprises a leading edge portion 750 arranged to enter a recess 760 formed in the electrical energy source 220 to lock the electrical energy source in position, wherein the leading edge portion 750 has an arcuate form with a curvature corresponding to that of a circle segment with radius 740 corresponding to the distance from the leading edge portion 750 to the center of the shaft 720, and wherein the recess 760 formed in the energy source 220 comprises a surface 770 arranged to engage the leading edge portion 750, wherein the surface 770 has an arcuate form to match that of the leading edge portion 750.

This way, as the electrical energy source 220 is received in the battery compartment 150, the locking member is inactive, simply yielding to the electrical energy source as it enters the compartment. This phase of inserting the electrical energy source 220 into the compartment 150 by moving it in an insertion direction 701 is schematically illustrated in FIGS. 7A and 7B. The locking member 710 then swings into the recess 760 where it prevents the battery to be retracted from the battery compartment. The locking position is illustrated in FIG. 7C. Notably, the arcuate form of the leading edge portion 750 allows the locking mechanism to be rotated out of the locking position with less resistance even if there is some friction between the leading edge portion 750 and the surface 770 arranged to engage the leading edge portion 750.

The locking member may be arranged spring biased towards the locking position, and operable by means of a lever or push-button mechanism, discussed below in connection to FIGS. 8 and 9.

It is appreciated that there may be any number of locking members arranged in the battery compartment in the way described above, i.e., anywhere from a single locking member up to a plurality of locking members.

According to some aspects, the battery compartment 150 comprises at least one resilient member 780 arranged to urge the electrical energy source into the locking position, i.e., urge the electrical energy source in a direction opposite that of the insertion direction 701. The resilient member 780, when compressed by the electrical energy source, pushes onto the electrical energy source to repel it from the battery compartment 150. This pushing force increases the contact pressure between the leading edge portion 750 and the surface 770 arranged to engage the leading edge portion 750, thereby improving the holding effect on the electrical energy source.

According to an example, a user inserts a battery into the battery compartment in an insertion direction. When the battery is inserted all the way, it contacts the resilient member 780 and the locking member 710 enters the recess 760 formed in the electrical energy source 220 to lock the electrical energy source in position. The resilient member, when compressed by the battery, pushes back in a direction opposite to the insertion direction. This pushing force from the resilient member increases a contact force between the leading edge portion 750 of the locking member and the surface 770 arranged to engage the leading edge portion 750, to hold the battery more securely in position.

The resilient member 780 optionally comprises any of a resilient material member, a compression spring, and/or a leaf spring.

The resilient member 708 will also eject the electrical energy source 220 a short distance from the battery compartment 150 when the electrical energy source is released by the locking mechanism 700. Thus, when the bush-button mechanism 810 is operated to release a battery, the battery is ejected from the battery compartment 150, making it easier to grasp the battery and pull it out from the battery compartment.

FIG. 7C schematically shows an example of such resilient members 780. The resilient members urge the electrical energy source in direction 702, but the electrical energy source is prevented from moving in this direction by the locking member 710 engaging the recess 760. The arrangement of resilient member 780 and locking member 710 on opposite sides S1, S2, of the electrical energy source 220 generates a twisting motion 795 or rotation moment which further increases the holding effect by increasing friction between battery and battery compartment wall, in a manner similar to a stuck cupboard or desk drawer. This further increase in holding effect reduces vibration by the battery since it is now held even more snugly in the battery compartment.

Figure 8:
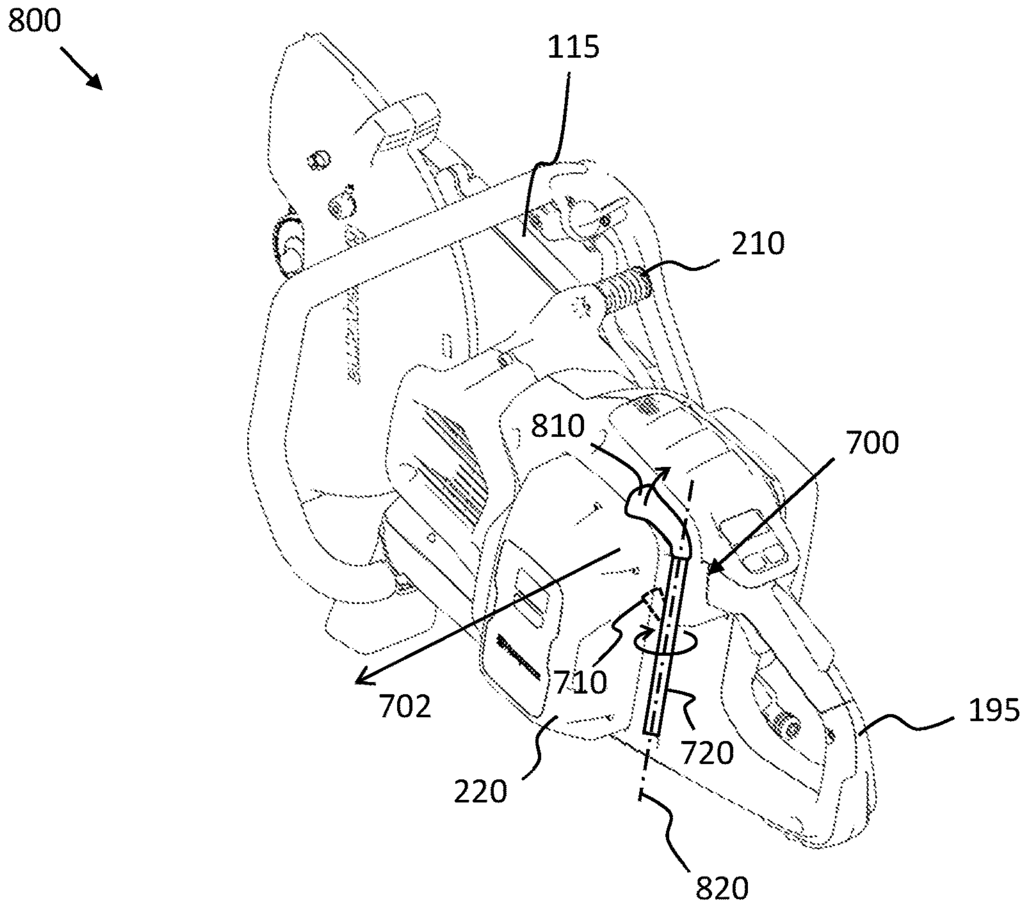
FIG. 8 shows an example work tool with a battery locking mechanism.

FIG. 8 shows an example work tool 800 which comprises the battery lock mechanism 700. The locking member 710 is rotatably supported on a shaft 720, where it is allowed to rotate about an axis 820 of rotation. A push-button mechanism 810 can be used by the operator to rotate the locking member 710 such that it exits the recess, thereby allowing removal of the battery in direction 702.

According to some aspects the locking member 710 is spring biased towards the locking position. Thus, as an electrical energy source 220 is inserted into the recess 150, the locking member 710 snaps into the locking position. The spring bias force can be overcome by the push-button mechanism 810 when the electrical energy source is to be removed from the battery compartment.

Figure 9:
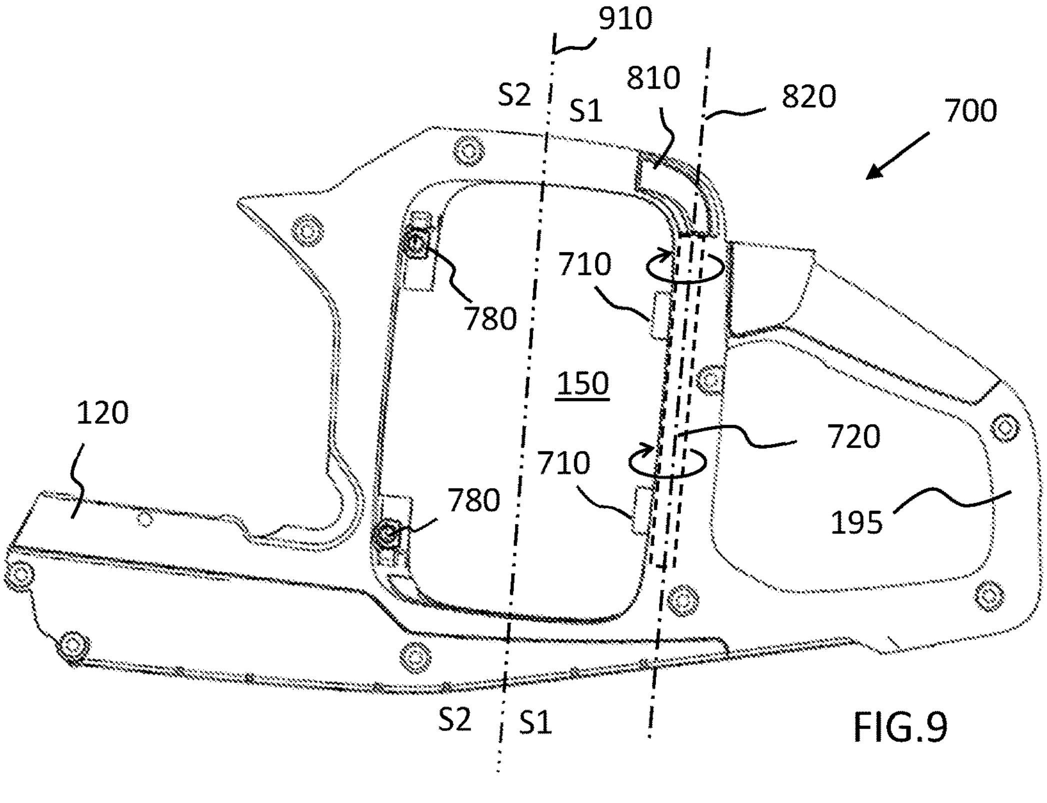
FIG. 9 schematically illustrates details of a battery lock mechanism.

FIG. 9 illustrates details of a battery lock mechanism 700 for a battery compartment 150. This battery lock mechanism can be used with many different types of tools, i.e., abrasive tools, grinders, chainsaws, drills, cut-of tools, and the like. Thus, the battery lock mechanisms disclosed herein are not limited to use with the cut-off tools discussed above in connection to FIGS. 1-8.

The battery lock mechanism 700 shown in FIG. 9 comprises a locking member 710 rotatably supported on a shaft 720 and optionally spring biased into a locking position as discussed above. The locking member comprises a leading edge portion 750 arranged to enter a recess 760 formed in the electrical energy source 220 to lock the electrical energy source in position, as discussed above in connection to FIGS. 7A-C. The leading edge portion 750 may have an arcuate form with a curvature corresponding to that of a circle segment with radius 740 corresponding to the distance from the leading edge portion 750 to the center of the shaft 720. The recess 760 formed in the energy source 220 comprises a surface 770 arranged to engage the leading edge portion 750. This surface 770 has an arcuate form to match that of the leading edge portion 750. Notably, the battery lock mechanism 700 illustrated in FIG. 9 comprises two locking members 710 separated by a distance. This double arrangement of locking members improves robustness of the lock mechanism 700.

Thus, as explained in connection to FIGS. 7A-C, an electrical energy source such as a battery can be inserted into the battery compartment in an insertion direction 701, i.e., into the compartment 150 shown in FIG. 9. At some point the locking member is able to enter into the locking position, i.e., it enters the recess 760. In this position the battery is prevented from moving in a direction 702 opposite to the insertion direction 701. However, it may rattle some and may not be firmly secured. To improve the battery lock mechanism and to better hold the electrical energy source in position, one or more resilient members 780, such as compression springs or rubber bushings, are arranged in the battery compartment 150 and/or on the electrical energy source to push on the electrical energy source as it is inserted all the way into the compartment. The pushing force increases a contact force between the leading edge portion 750 and the surface 770 configured to engage the leading edge portion. This increased contact force increases friction to better hold the electrical energy source in position.

According to some aspects, the at least one resilient member 780 and the battery lock mechanism 700 are arranged at opposite sides S1, S2 of the battery compartment 150, i.e., there is a plane 910 that divides the battery compartment in two parts, where the resilient member 780 is comprised in one part and the battery lock mechanism is comprised in the other part. This means that the resilient member or members push onto the electrical battery source from a direction to cause a twisting motion 795 or torque. This twisting motion can be compared to a drawer which gets stuck in a cupboard or desk. The electrical energy source is then prevented from rattling and is more firmly secured in the battery compartment 150.

Figure 10B:
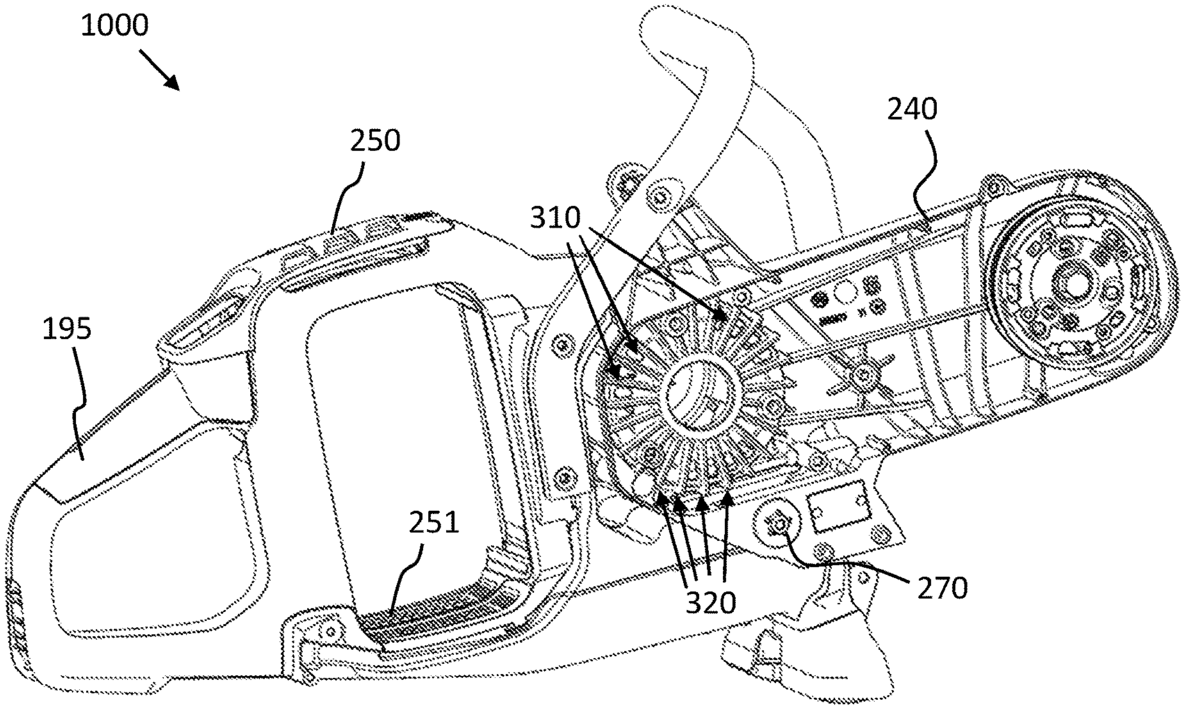
Figure 11:
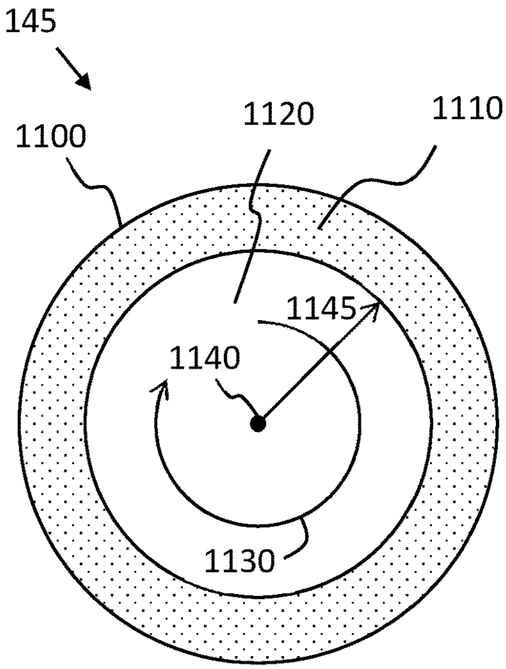
FIG. 11 schematically illustrates a fan.
Figure 12:
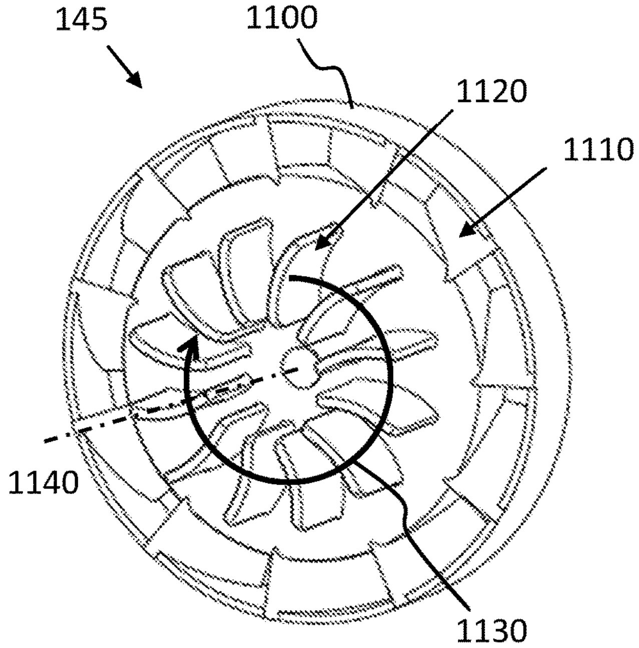
FIG. 12 shows an example fan for a work tool.

FIGS. 10A and 10B show an example work tool 1000 comprising a special type of fan 145. This fan comprises a member, preferably but not necessarily discoid shaped, arranged on the axle of the electric motor 140 which also constitutes an axis of rotation of the fan. The member extends in a plane perpendicular to the axis of rotation and comprises two different types of fan portions. A first portion acts as an axial fan and pushes cooling air transversally 201 across the work tool 1000 to cool the electric motor 140. A second section of the fan acts as a radial fan, also known as a centrifugal fan, to push cooling air downwards and into the second part of the work tool in cooperation with a fan scroll matched to the radial fan portion. The fan 145 is schematically illustrated in FIG. 11 and an example of the fan is shown in FIG. 12 where the direction of rotation 1130 and the axis of rotation 1140 have been indicated. FIG. 11 also indicates the direction 1145 referred to as 'radially outwards' from the axis of rotation 1140.

FIG. 10A shows an example tool where According to some aspects, the portion of the flow of cooling air 160 from the first part 110 and into the second part 120 is arranged to enter the electrical energy source 220 via a third outlet 251 arranged inside the battery compartment 150. This connection to the electrical energy source improves cooling efficiency by better cooling, e.g., the cells in a battery.

The fan 145 comprises an axial fan portion 1110 arranged peripherally on the fan 145, i.e., circumferentially along the fan disc border as shown in FIG. 11 and in FIG. 12, and a radial fan portion 1120 arranged centrally on the fan 145, i.e., radially inwards from the axial fan portion as shown in FIGS. 11 and 12. Thus, the axial fan portion is arranged radially outwards 1145 in the extension plane from the axis of rotation 1140. The axial fan portion 1110 is arranged to generate the flow of cooling air 1330 for cooling the electric motor 140, and the radial fan portion 1120 is arranged to generate the portion of the flow of cooling air 160 from the first part 110 and into the second part 120 for cooling the electrical storage device.

Axial flow fans, or axial fans, have blades that force air to move parallel to the shaft about which the blades rotate, i.e., the axis of rotation. This type of fan is used in a wide variety of applications, ranging from small cooling fans for electronics to the giant fans used in wind tunnels. The axial fan is particularly suitable for generating large air flows in straight tube-line conduits, which is the case here when cooling the electric motor 140.

Radial fans, or centrifugal fans, uses the centrifugal power supplied from the rotation of impellers to increase the kinetic energy of air/gases. When the impellers rotate, the gas particles near the impellers are thrown off from the impellers, then move into the fan housing wall. The gas is then guided to the exit by a fan scroll. A radial fan, compared to the axial fan, is better at pushing cooling air at a pressure passed air conduits with bends and narrow passages, which is the case for the air conduit passing into the second part and towards the battery compartment 150.

According to some aspects, the axial fan and the radial fan are formed as separate parts mounted on the same motor axle.

The radius of the radial fan may correspond to the radius of the electrical motor gable.

The relationship between the radius of the radial fan and the radius of the fan may be on the order of 50-70 percent.

Thus, advantageously, the fan illustrated in FIGS. 10-13 provide both efficient motor cooling as well as efficient cooling of tool members in the second part, e.g., the control unit and the electrical energy source. This is achieved by providing two different types of fans on a single fan member.

Figure 10C:
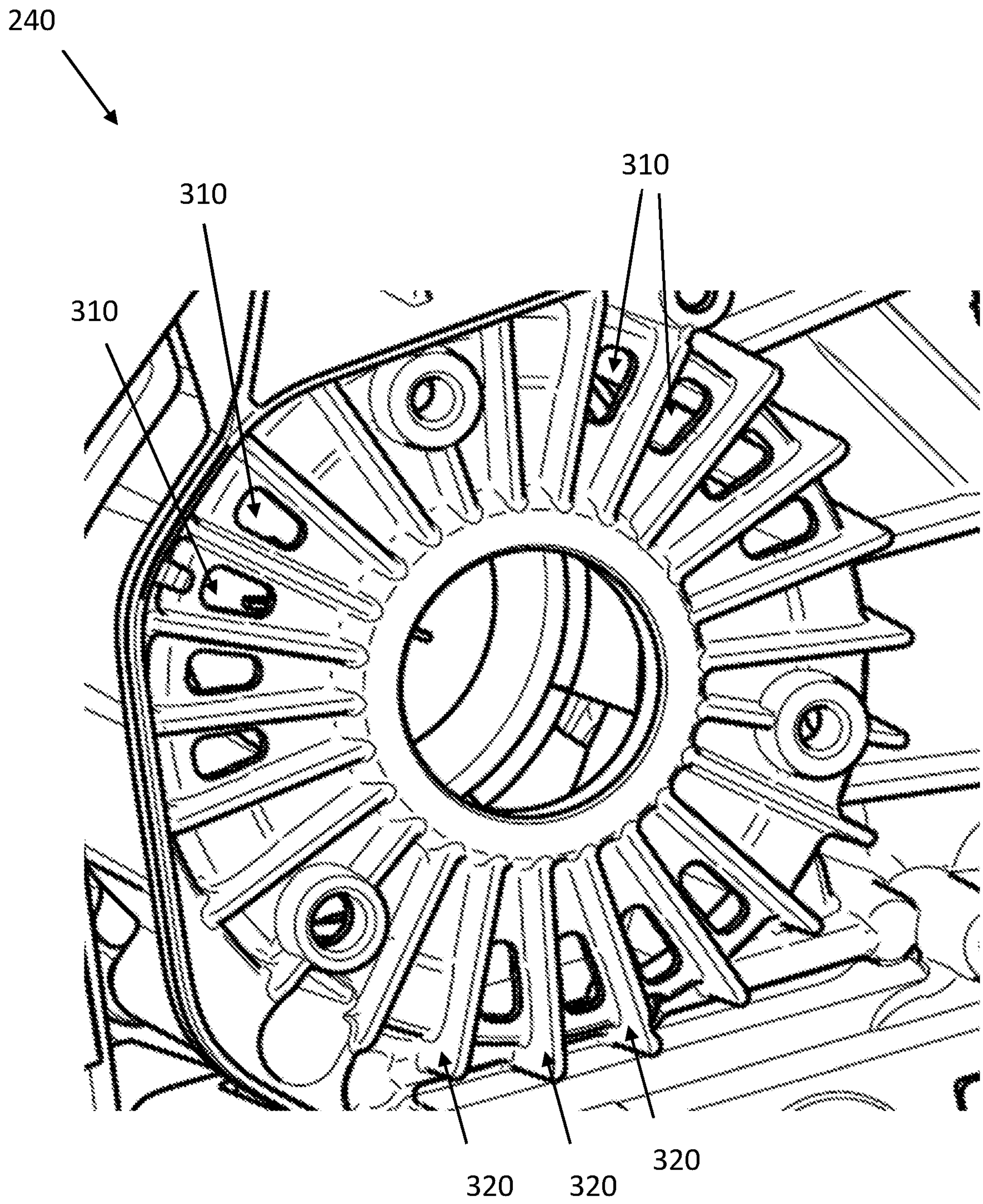

FIG. 10C shows a more detailed view of the part of the support arm which comprises the one or more cooling flanges 320 arranged to dissipate heat away from the electric motor 140 via the support surface 330. The openings 310 for letting air enter the interior space 340 discussed above can also be seen. The axial fan portion 1110 pushes air past the motor and through these holes, thereby cooling the electric motor 140.

Figure 13:
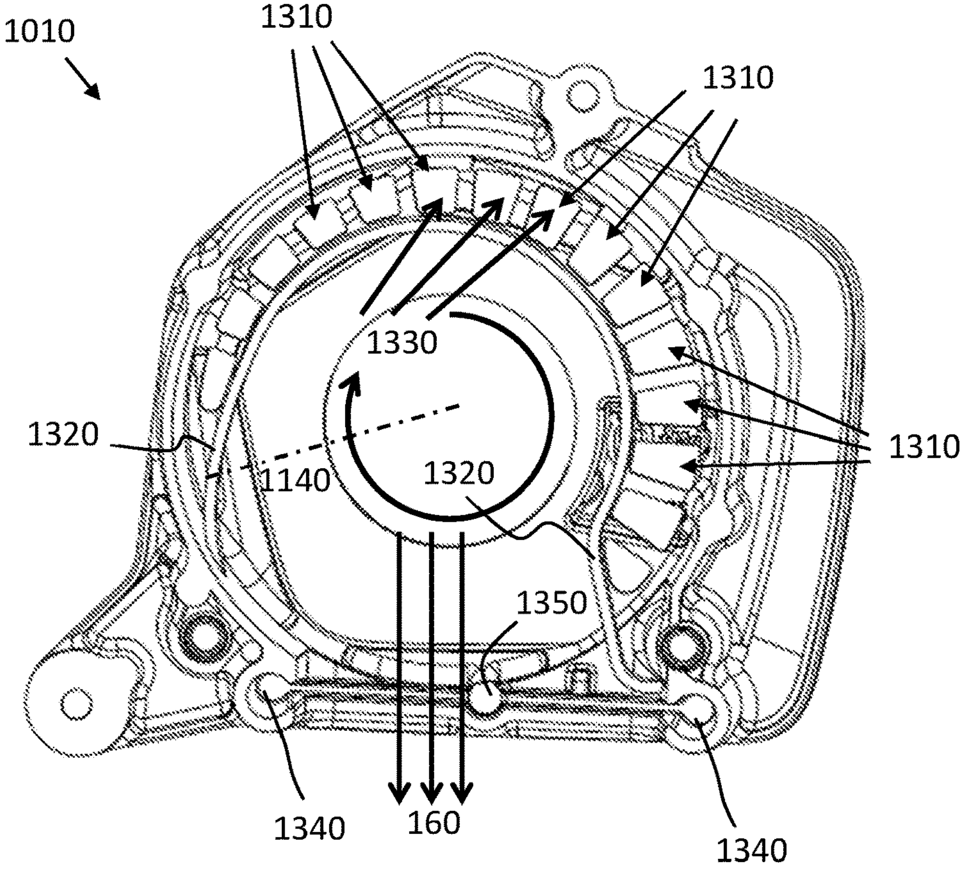
FIG. 13 shows an example fan housing.

The fan 145 may optionally be assembled in a fan housing 1010 exemplified in FIG. 13. The fan housing comprises at least one opening 1310 arranged peripherally and radially outwards from the axis of rotation 1140 to receive the flow of cooling air 1330 from the axial fan portion 1110 for cooling the electric motor 140. The fan housing also comprises a fan scroll 1320 arranged centrally in the housing to interface with the radial fan portion 1120 for guiding the portion of the flow of cooling air 160 from the first part 110 and into the second part 120 for cooling the electrical storage device.

FIG. 13 also shows the grooves 1340 and the recesses 1350 for receiving the bellows 170 with the edge portions 430 and the poka-yoke feature 410 illustrated in FIG. 4.

The fan discussed in connection to FIGS. 10A, B, 11, 12, and 13 is not only applicable to the types of work tools disclosed herein. On the contrary, this fan can be used with advantage in any type of work tool where a first flow of cooling air and a second flow is desired. Thus, there is disclosed herein a fan 145 for a hand-held work tool 100, 200, 800, 1000. The fan 145 extends in a plane perpendicular to an axis of rotation of the fan 1140. The fan comprises an axial fan portion 1110 arranged radially outwards 145 from a radial fan portion 1120 arranged centrally on the fan 145 with respect to the axis of rotation 1140, wherein the axial fan portion 1110 is arranged to generate a first flow of cooling air for cooling a first hand-held work tool member, and wherein the radial fan portion 1120 is arranged to generate a second flow of cooling air 160 for cooling a second hand-held work tool member.

Optionally, the axial fan portion 1110 has an annular shape centered on the axis of rotation 1140, and wherein the radial fan portion 1120 has a discoid shape centered on the axis of rotation 1140.

There is also disclosed herein a hand-held work tool 1000 comprising the fan discussed in connection to FIGS. 10-13, and a fan housing 1010. The fan 145 is assembled in the fan housing 1010, which fan housing comprises at least one opening 1310 arranged peripherally in the fan housing and radially outwards from the axis of rotation 1140 of the fan 145 to receive the first flow of cooling air from the axial fan portion 1110 for cooling the first hand-held work tool member, the fan housing also comprises a fan scroll 1320 arranged centrally in the fan housing to interface with the radial fan portion for guiding the second flow of cooling air 160 for cooling a second hand-held work tool member.

Figure 16A:
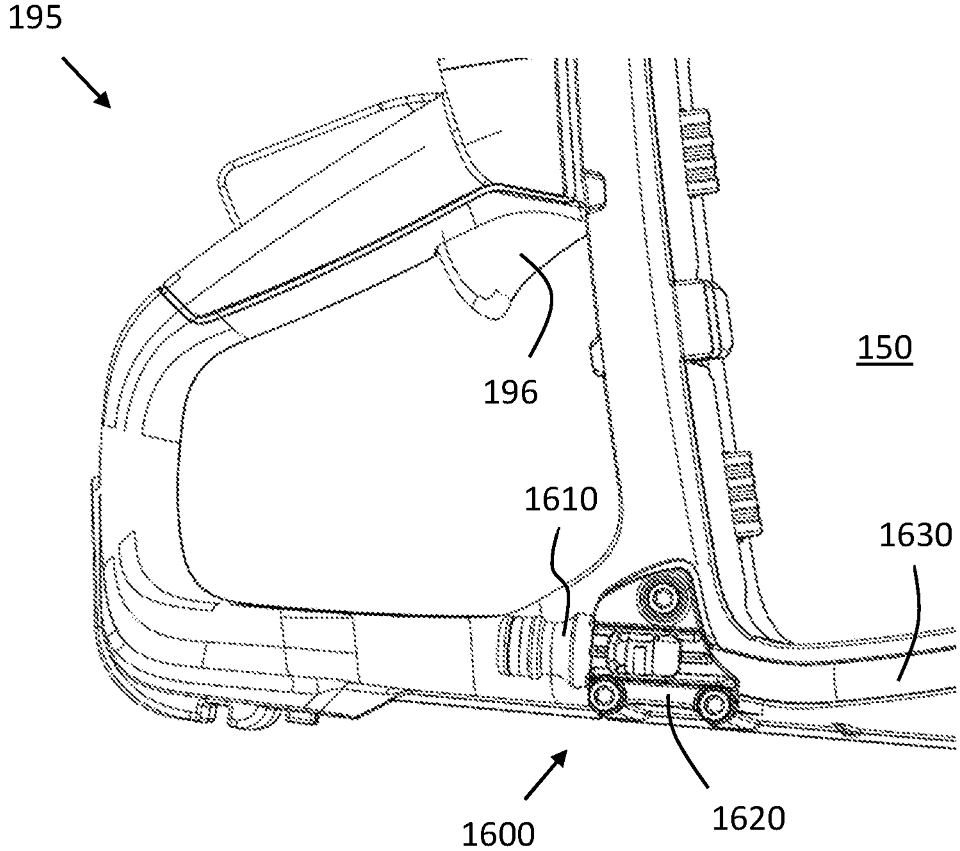
FIG. 16A shows a rear handle section with a water hose connection.

FIG. 16A illustrates details of an optional connector arrangement 1600 for a water hose which is preferably mounted in vicinity of the rear handle 195 where it is easily accessible by an operator to attach and to detach a water hose. The connector arrangement 1600 comprises a water hose connector part 1610, here shown as a nipple, i.e. a connector male part, for a water hose quick connector system facing rearwards away from the circular cutting tool 130. The connector nipple 1610 is mounted fixedly onto the machine housing by a bracket 1620 such that the water hose connector part 1610 is fixedly held in relation to the work tool. Alternatively, a female water hose connector part can be fixedly mounted onto the work tool by a similar bracket to obtain the same technical effect and advantages. A water hose 1630 extends away from the connector part 1610 towards the cutting tool 130. The water hose 1630 is arranged at least partly embedded into the tool housing, in order to protect the water hose from damage during use of the tool 100.

Known water hose connector arrangements often comprise a segment of hose in-between a bracket on the work tool and the connector part (male or female connector part), which means that it is difficult to connect and to disconnect the water hose with a single hand. The connector arrangement 1600, however, allows for attachment and detachment of a water hose for supplying water to the cutting tool 130 during operation by one hand, since the connector nipple 1610 is mounted fixedly onto the machine housing by the bracket 1620. Thus, the connector part is firmly supported by the machine housing where it is easily accessible and does not move around. An operator may, for instance, hold the tool by the front handle 190 with one hand and connect the water hose with the other hand. The connector part 1610 may be adapted for interfacing with any quick connector system on the market, such as the Gardena® water hose system.

The water hose connector arrangement 1600 comprising the connector part 1610 and the bracket 1620 can be implemented on any power tool requiring a supply of water, it is not limited to the particular tools discussed herein.

Figure 16B:
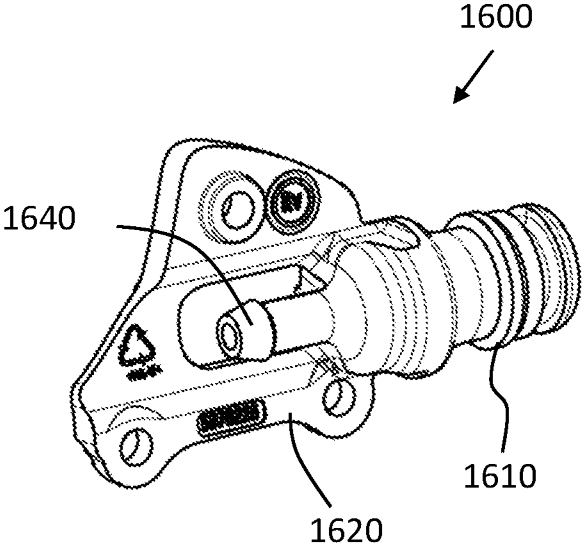
FIGS. 16B-C show details of a water hose connector arrangement.
Figure 16C:
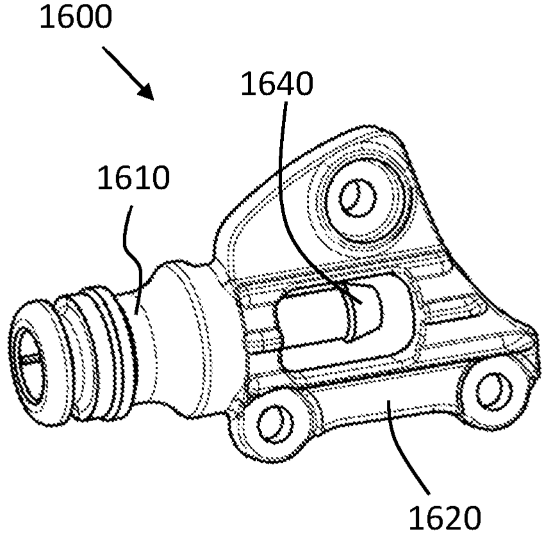

FIGS. 16B and 16C show views of the connector arrangement 1600 in more detail. FIG. 16B is a view corresponding to that in FIG. 16A, while FIG. 16C shows the connector arrangement 1600 from an opposite point of view. The connector part 1610 and the bracket 1620 are preferably integrally formed, i.e., machined or molded from one piece of material, such as a piece of plastic or metal. An internal nipple 1640 for attaching the water hose 1630 may be arranged opposite to the connector part 1610 for convenient assembly of the connector arrangement on the hand-held work tool.

Figure 17A:
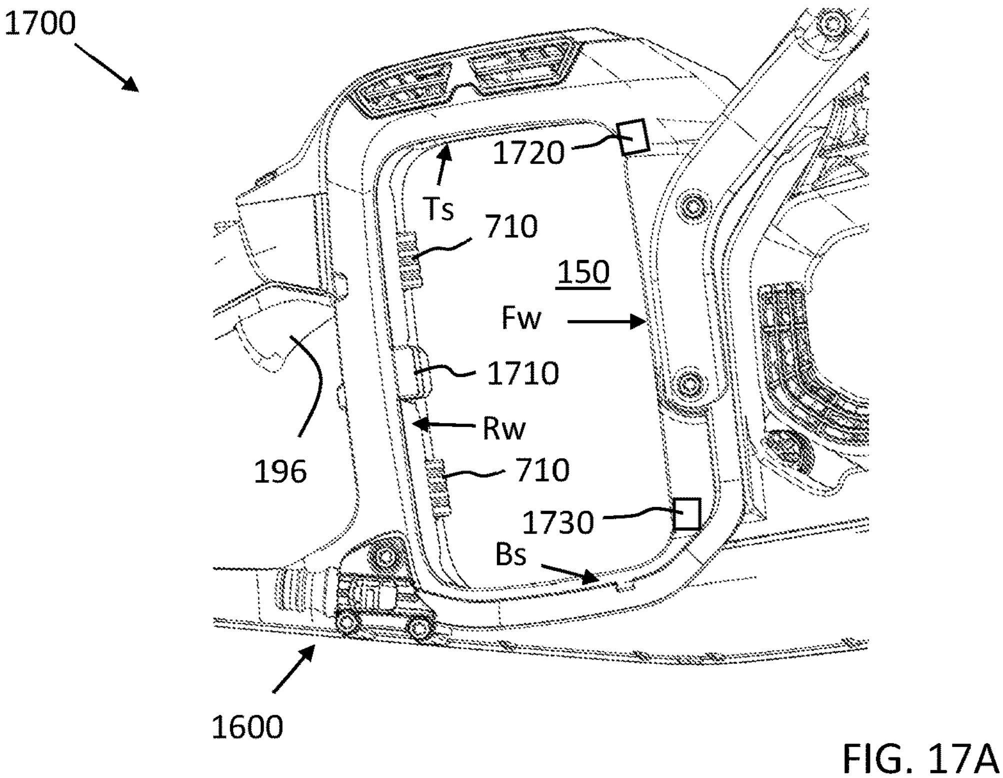
FIGS. 17A-B illustrate details of a battery compartment.
Figure 17B:
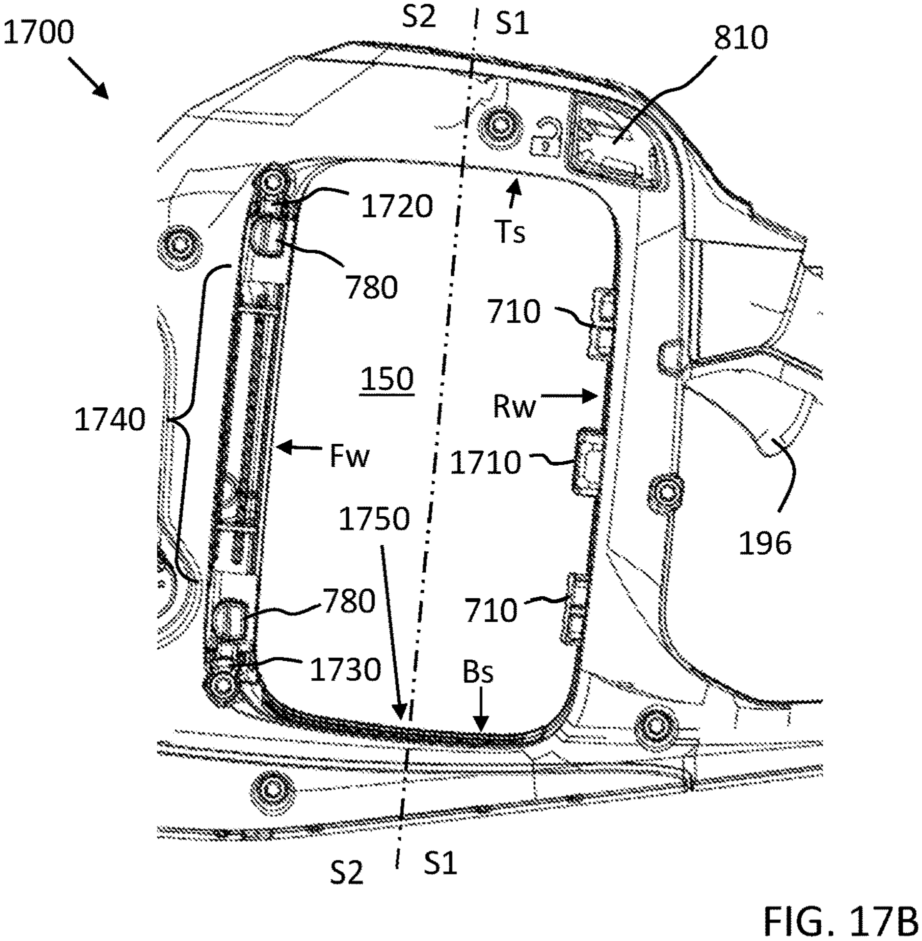

FIGS. 17A and 17B illustrate details of an example battery compartment 150. An electrical energy source such as a battery can be inserted into the battery compartment in an insertion direction 701, i.e., into the compartment 150 as also shown in FIG. 9. FIG. 17A is a view opposite to the insertion direction 701, while FIG. 17B is a view looking into the compartment 150 in the insertion direction 701. The locking members 710, discussed above in connection to, e.g., FIG. 9 can be seen in FIGS. 17A and 17B. The battery, which will be discussed in more detail below in connection to FIGS. 18A-C optionally comprises a rearward face formed as a handle to simplify both insertion and removal of the battery in the battery compartment 150.

Batteries for powering heavy duty cut-off tools such as the work tools discussed herein are normally quite heavy. Thus, the batteries must be held in the battery compartment 150 in a robust and reliable manner. Towards this end, the battery compartment 150 comprises a battery holding mechanism specifically adapted to support a heavy battery, i.e., weighting on the order of 5 kg, such as between 3-7 kg.

The battery compartment 150 extends transversally through the housing of the tool 100, 200 as discussed above, where it defines a volume for receiving a battery. The volume is delimited by a rear wall Rw and a front wall Fw, where the rear wall Rw is located towards the rear handle 195 on the tool 100 and the front wall Fw is located towards the front of the tool 100, i.e., towards the cutting tool 130. A bottom surface Bs and a top surface Fs also delimits the volume. The example volume in FIGS. 17A and 17B is of a rectangular shape with rounded corners.

The battery holding mechanism comprises a supporting heel 1710 arranged on a middle section of a side wall of the battery compartment, more specifically on the rear wall Rw closest to the rear handle 195. The heel is 1710 elongated with an elongation direction extending transversally through the battery compartment aligned with an insertion direction of the battery in the battery compartment 150. When the machine is resting on the ground support member 280, the supporting heel 1710 is parallel to ground. Also, when the tool 100 is held in a normal operating position, the supporting heel is parallel to ground, and therefore supports the battery against gravity. It is appreciated that the supporting heel 1710 can also be arranged on the front wall, i.e., on any of the front wall and/or the rear wall of the battery compartment. The battery, which is exemplified in FIGS. 18A-C and will be discussed below, comprises a corresponding groove matched to the supporting heel.

According to some aspects the supporting heel 1710 is metal shod for increased mechanical integrity, i.e., the supporting heel 1710 is optionally constructed with an outer layer metal layer for increased mechanical robustness.

According to some other aspects, the battery compartment also comprises an upper groove 1720 and a lower groove 1730 for supporting the battery in the battery compartment 150. The grooves are arranged to mate with corresponding ridge structures on the battery, such that the battery can be inserted into the battery compartment 150 in mating position with the grooves in the insertion direction 701. Thus, the supporting heel 1710 and the grooves 1720, 1730 collaborate to support the battery in the battery compartment in a safe and roust manner. The grooves 1720, 1730 have the function to guide the battery as it is inserted into the battery compartment 150 and prevents snagging as the battery is removed from the battery compartment 150.

The grooves 1720, 1730 are preferably formed as dovetail grooves.

According to some aspects, the grooves 1720, 1730 are metal shod for increased mechanical strength, i.e., the grooves are reinforced with a lining layer of metal for increased mechanical robustness.

FIG. 17B also shows two resilient members 780 as discussed above in connection to FIG. 7C, arranged to urge the battery into the locking position, i.e., urge the electrical energy source in a direction opposite that of the insertion direction 701.

Contact strips 1740 extending in the insertion direction 701 are arranged in the battery compartment 150 to mate with corresponding electrical connectors configured in slots on the battery.

Figure 18A:
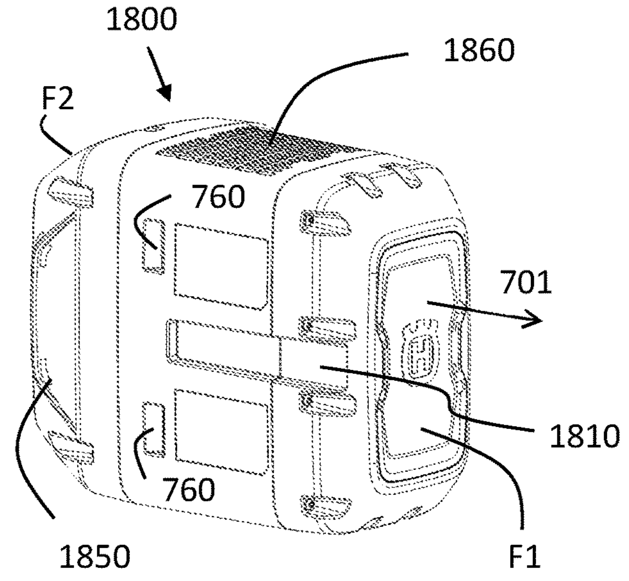
FIGS. 18A-C show a battery for insertion into a battery compartment.
Figure 18B:
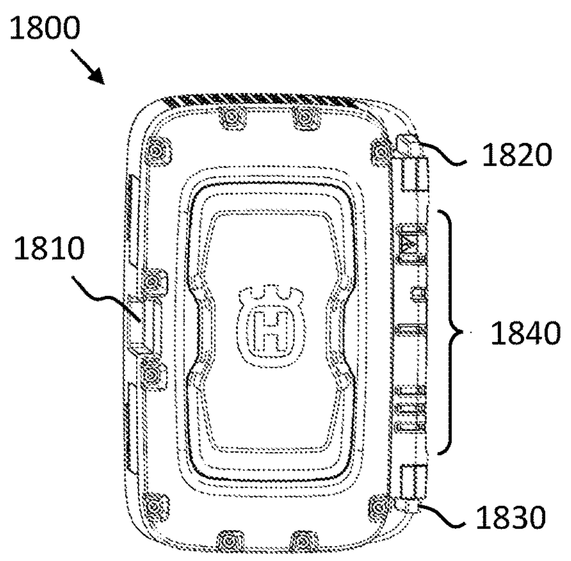
Figure 18C:
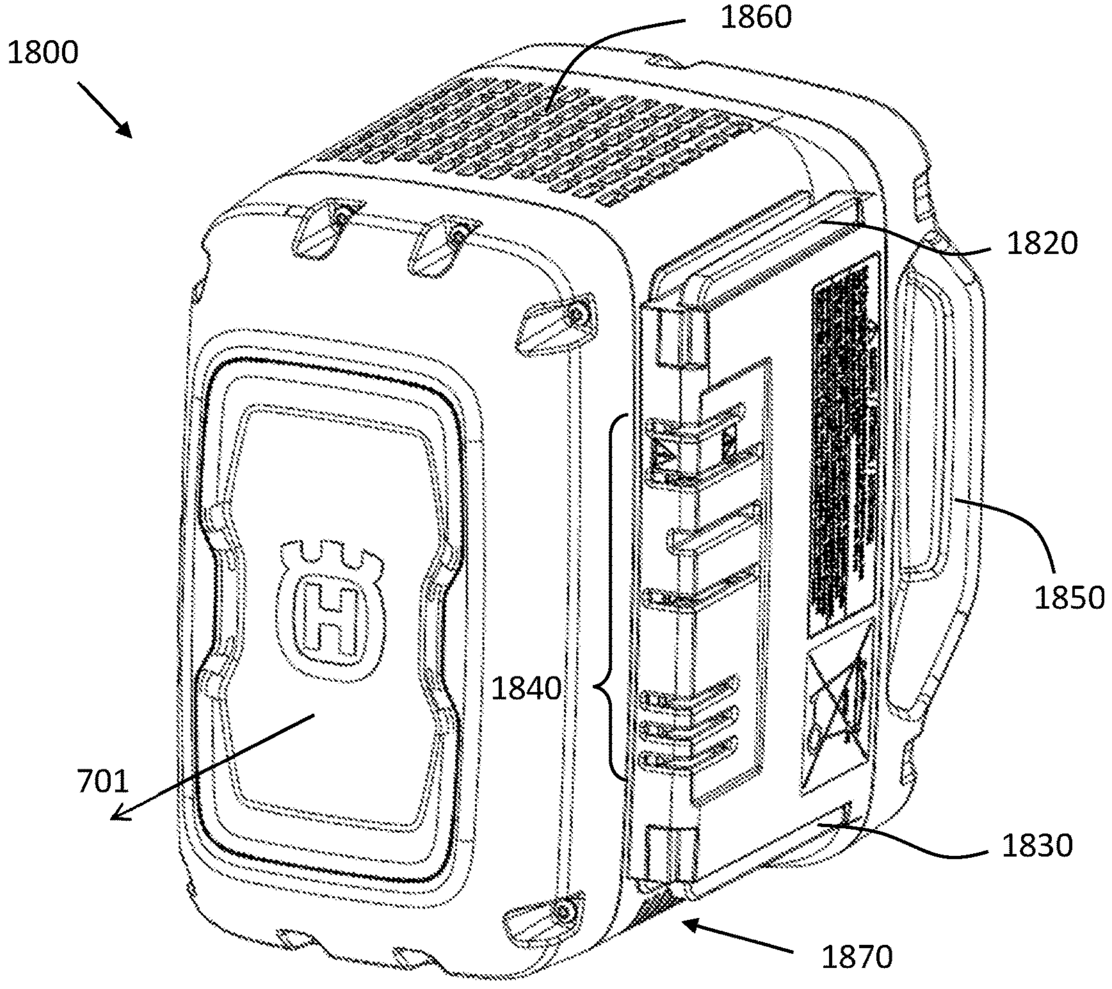

There is also disclosed herein a battery 1800 as shown in FIGS. 18A-C for insertion into the battery compartment 150. The battery 1800 has a weight between 3-7 kg and comprises a groove 1810 arranged on one side of the battery to mate with a corresponding supporting heel 1710 arranged on a wall of a battery compartment 150. The groove optionally has an initial bevel to simplify mating with the supporting heel 1710. The battery 1800 further comprises an upper ridge structure 1820 and a lower ridge structure 1830 on an opposite side of the battery compared to the groove 1810, as shown in FIG. 18, for mating with corresponding grooves 1720, 1730 of the battery compartment 150. Thus, the battery 1800 is configured for insertion into the battery compartment 150 discussed in connection to FIGS. 17A and 17B.

The grooves 1720, 1730 are preferably formed as dovetail grooves.

The battery 1800 comprises at least one recess 760 configured to receive a respective locking member 710 of a battery lock mechanism 700 as discussed above. The locking member comprises a leading edge portion 750 with an arcuate form and the recess 760 comprises a surface 770 arranged to engage the leading edge portion 750. The surface 770 has an arcuate form to match that of the leading edge portion 750. Two recesses are advantageously arranged on either side of the elongated supporting heel 1710 as shown in FIG. 18A.

The battery 1800 exemplified in FIGS. 18A-C also comprises one or more electrical connectors 1840 arranged protected in slots extending in the insertion direction to mate with corresponding contact strips 1740 arranged in the battery compartment 150.

Optionally, the battery 1800 comprises a forward face F1 facing in the insertion direction 701 when the battery 1800 is inserted in the battery compartment 150, and a rearward face F2 opposite to the forward face, wherein the rearward face is formed as a handle 1850 to allow gripping by one hand.

The battery also comprises electrical connectors 1840 configured in slots extending in the insertion direction to mate with corresponding contact strips 1740 arranged in the battery compartment 150. The electrical connectors are thereby protected from mechanical impact.

To promote cooling of the battery, there is an air inlet arranged on a bottom side of the battery which is in fluid communication with an air outlet 1860 arranged on the upper side of the battery, as seen in FIG. 18C. Thus, the air stream 160 from the fan 145 can be guided through the battery 1800 to better cool the battery cells.

The battery and the battery compartments discussed in connection to FIGS. 17 and 18 can also be used with other handheld tools. Thus, the features disclosed in connection to the battery compartment and battery are not dependent on any other particular features of the tools discussed herein.

Figure 19:
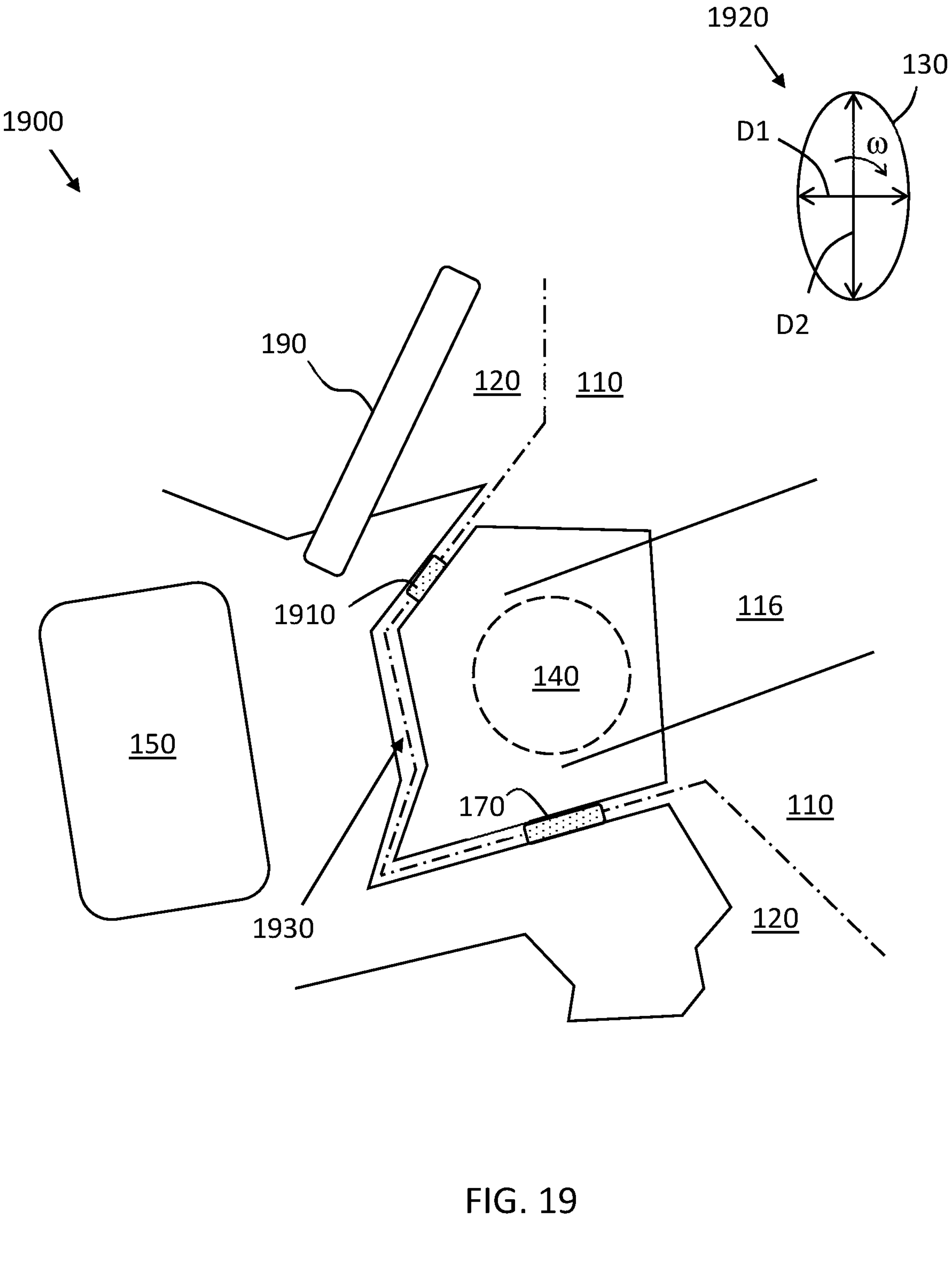
FIG. 19 schematically illustrates a cut-off tool.

FIG. 19 illustrates an example hand-held electrically powered cut-off tool 1900 comprising a first part 110 and a second part 120 arranged vibrationally isolated from each other by one or more damping members 170, 1910 optionally in combination with one or more resilient members such as the metal springs 210 shown in, e.g., FIG. 2A and FIG. 2C. As will be discussed in more detail below in connection to FIG. 25, the first part is associated with a first mass M1 and the second part is associated with a second mass M2. Notable, the ratio of the second mass M2 to the sum of masses M1+M2 is much larger than what is customary for, e.g., similar size combustion engine powered cut-off tools. This mass ratio provides for a more efficient anti-vibrating function between the first and the second parts, as well as a more stable cutting operation and also an increased operator comfort level during operation.

A problem which may potentially occur in the type of hand-held cut-off tools discussed herein is that the cutting disc 130 turns slightly oval during use. This is an undesired situation since an excessively oval shaped cutting disc hampers cutting performance and may cause discomfort to the operator. An oval shaped cutting disc may also be associated with an increased risk of kickback, which is undesired. An example of an oval shaped cutting disc 130 is illustrated in the insert 1920 of FIG. 19. An oval shaped cutting disc is associated with a variation in disc "diameter" D1, D2 measured over the disc, i.e., D1 and D2 in FIG. 19 are not equal but differ by some non-negligible amount. The measurements D1 and D2 may be seen as half of the semi-minor and semi-major axes of an ellipse, although it is appreciated that an oval shaped cutting disc will often not be perfectly elliptical but exhibit an unevenness in radius along its perimeter.

This problem with oval-shaped cutting discs tends to be more pronounced for lower cutting disc angular speeds ω, such as when the cut-off tool is operated below 3600-4000 rpm or so, measured at the axis of rotation of the cutting disc 130. Hand-held electrically powered cut-off tools which comprise vibrationally isolated first and second parts, such as the tools 100, 200, 800, 1000, 1900 discussed herein, may be particularly prone to the problem of oval shaped cutting discs.

According to some aspects, the hand-held electrically powered cut-off tools discussed herein, and in particular in connection to FIGS. 19-22 are arranged to operate at a cutting disc rotational speed ω below 4000 rpm and preferably at about 3200 rpm.

A solution to the problem with oval discs can be to simply increase the cutting disc rotational speed ω to, say, speeds above 4000 rpm. However, such high cutting disc speeds are undesired for many reasons.

For instance, when dry cutting, i.e., when cutting concrete or stone by the hand-held electrically powered cut-off tool without adding fluid such as water to the cutting zone, it becomes very difficult to efficiently collect the generated dust if the cutting disc speed is too high, it is therefore desired to reduce cutting disc speed in dry cutting applications. Suitable cutting disc speeds for dry cutting application are normally on the order of about 3100-3300 rpm and preferably about 3200 rpm. These speeds may even be considered maximum cutting speeds under normal dry-cutting operating conditions.

High cutting disc speeds also mean that the cutting disc stores more energy during operation. This, in turn, means that it becomes harder to quickly reduce cutting disc speed by braking, such as during a kickback event. Thus, for safety reasons, it may be desirable to limit cutting disc speeds to speeds around 3100-3300 rpm, e.g., to about 3200 rpm.

Furthermore, electrically powered cut-off tools may face challenges in generating sufficient torque for efficient cutting operation if the cutting disc speed is too high. For this reason cutting disc speeds w on the order of about 3100-3300 rpm may be preferred.

It is appreciated that the cutting disc speeds mentioned above are just examples which are dependent on many aspects such as type of tool, cutting disc size, electric motor specification, and the like. However, the general principles of high cutting disc speed vs low cutting disc speeds apply to most cut-off tools.

It has been realized that the problem with oval shaped cutting discs can be mitigated if damping members are arranged in-between the first part 110 and the second part 120, optionally in combination with resilient members formed as metal springs for efficient vibration isolation. These damping members are different from the customary spring-based anti-vibration elements normally used on this type of tool, since they are formed in a resilient material associated with a damping coefficient. The damping members suppress oscillating behavior between the two masses of a hand-held electrically powered cut-off tool comprising a first part and a second part arranged vibrationally isolated from each other. By this suppression, the tendency to form oval shaped cutting blades at low cutting disc speeds is mitigated. This is at least in part because, without the damping members, the two masses of a de-vibrated cut-off tool operated at a given cutting disc speed, may come into such oscillating behavior as to exert different cutting pressure on different sections of the cutting blade. That is, the oscillation motion may become synchronous with the rotation of the cutting disc. When the system comprising the first part 110 and the second part 120 enters into this type of oscillating state, an oval shaped cutting disc may result.

Modern combustion engine powered cut-off tools, as a rule, comprise resilient elements in the form of metal springs to suppress vibration between the motor and cutting disc part, and the part with the handles. However, these springs are not damping members in the sense of suppressing oscillating behavior of one mass in relation to another mass. Relative harmonic motion between two masses can be approximated by the behavior of two masses connected by a spring, where the restoring forces obey Hooke's Law and is directly proportional to the displacement of the two masses from equilibrium position. Any system that obeys simple harmonic motion is known as a simple harmonic oscillator. This type of oscillating behavior can be mitigated by adding a damping effect to the system, which can be done by adding a damping member associated with a damping coefficient (often denoted c) or an arrangement which limits a stroke length of one part in relation to the other part. The damping ratio is a measure describing how rapidly the oscillations decay from one "bounce" to the next. The damping ratio can vary from undamped ($\zeta=0$), underdamped ($\zeta<1$) through critically damped ($\zeta=1$) to overdamped ($\zeta>1$). The addition of damping members to a mass-spring system has an effect on the damping ratio.

FIG. 19, with reference also to FIG. 1, shows a hand-held electrically powered cut-off tool 1900 comprising a first part 110 and a second part 120 arranged vibrationally isolated from each other. The first part 110 comprises an arm 116 arranged to support a cutting disc 130 (illustrated in the insert 1920 in FIG. 19) and an electric motor 140 arranged to drive the cutting disc. The second part 120 comprises front 190 and rear 195 handles for operating the cut-off tool, and a battery compartment 150 for holding an electrical storage device 220, 1800 such as a battery arranged to power the electric motor 140. An example of this battery was discussed above in connection to FIGS. 18A-C.

Notably, one or more damping members 170, 1910 are arranged in-between the first part 110 and the second part 120, where at least one damping member 170, 1910 is formed in a resilient material associated with a damping coefficient.

The damping member or members are arranged to suppress or interfere with an oscillation of the second part 120 relative to the first part 110. Thus, the risk of ending up with an oval shaped cutting disc is mitigated.

According to aspects, the at least one damping member 170, 1910 is made of rubber, a resilient plastic material, closed-cell foam, or a resilient synthetic resin. Common to these damping members is that they introduce a damping coefficient into the resonance equations of the mechanical system comprising the first part 110 and the second part 120. This damping coefficient effectively suppresses oscillating behavior of the first part in relation to the second part. For example, a collar of closed cell-foam may be arranged around the flexible air flow conduit 170 shown in FIG. 1, or the collar of closed cell foam may even constitute the flexible air flow conduit 170.

Preferably, since metal springs are more effective when it comes to vibrationally isolating parts from each other, the first part 110 is also vibrationally isolated from the second part 120 by one or more resilient elements 210 in addition to the at least one damping member 170, 1910, wherein the one or more resilient elements 210 comprises at least one metal spring. Thus, a combination of metal springs and resilient material damping members together provide both efficient vibrational isolation as well as a reduced risk of getting an oval shaped cutting disc during operation of the cut-off tool.

FIG. 19 illustrates two example types of damping members which can be used independently of each other or in combination. It is also appreciated that the present teaching encompasses other types of damping members, applied in other places in-between the first and second parts. For instance, in-between may also be construed as encompassing a damping member which is attached to both the first and the second part but extends outside of the slot 1930 formed between the first and the second part.

Figure 20:
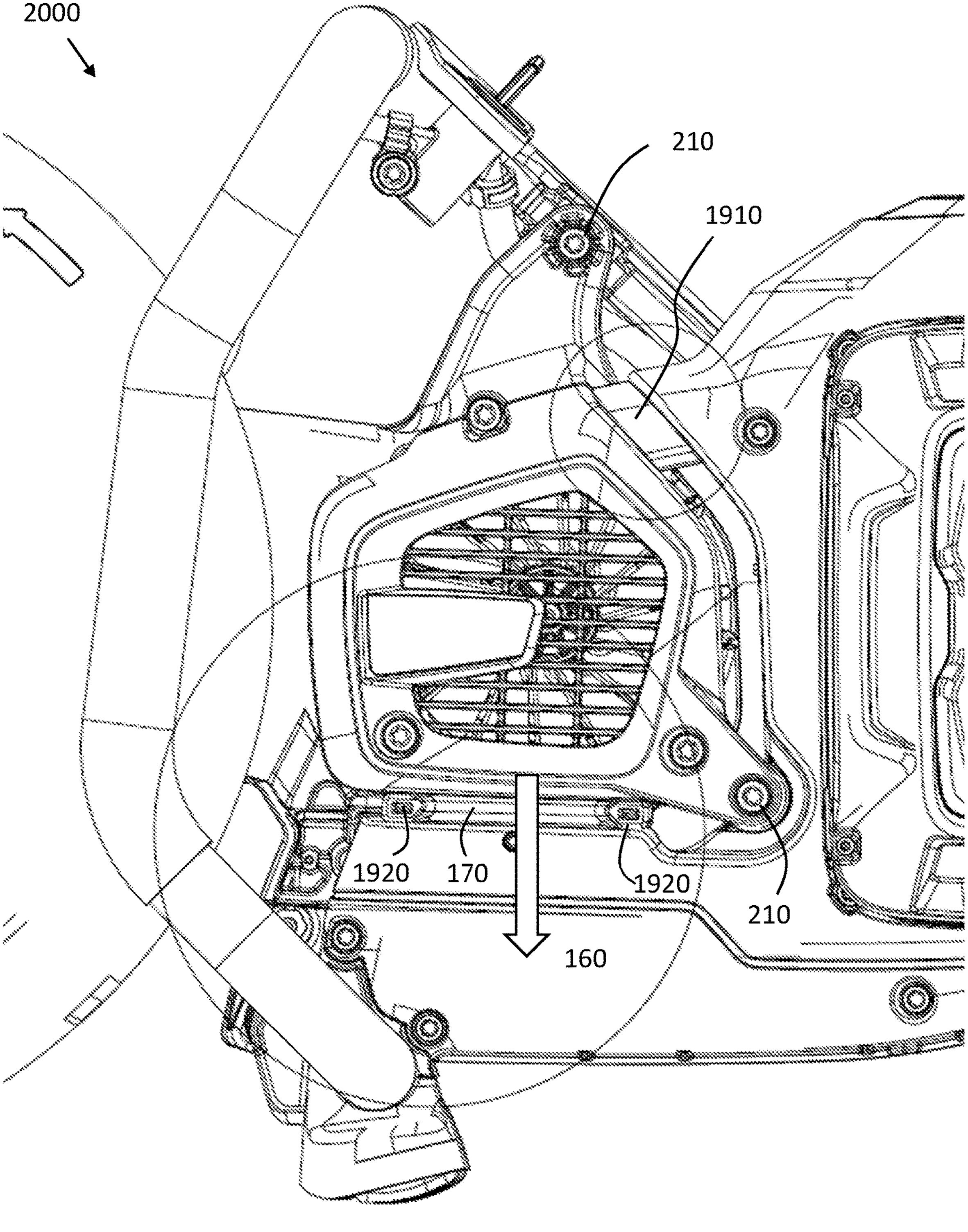
FIG. 20 shows details of a cut-off tool.

FIG. 20 illustrates two example damping members 1910, 1920. A first damping member 170 is integrated with a bellows 2100 (shown in more detail in FIG. 21) or other flexible air flow conduit arranged in-between the first 110 and the second 120 parts. This bellows or flexible air flow conduit provides a damping coefficient as discussed above to provide a desired damping ratio and also acts to limit a stroke length associated with a relative motion of the first part 110 relative to the second part 120. As the first part 110 moves towards the second part 120 in direction C, shown in FIG. 21, the reinforcement elements 1920 arranged on at least one side of the bellows, such as on two or more sides of the bellows 2100, limit compression of the bellows and thereby limits the stroke length of the oscillating motion, thus interfering with an oscillating behavior.

Figure 21:
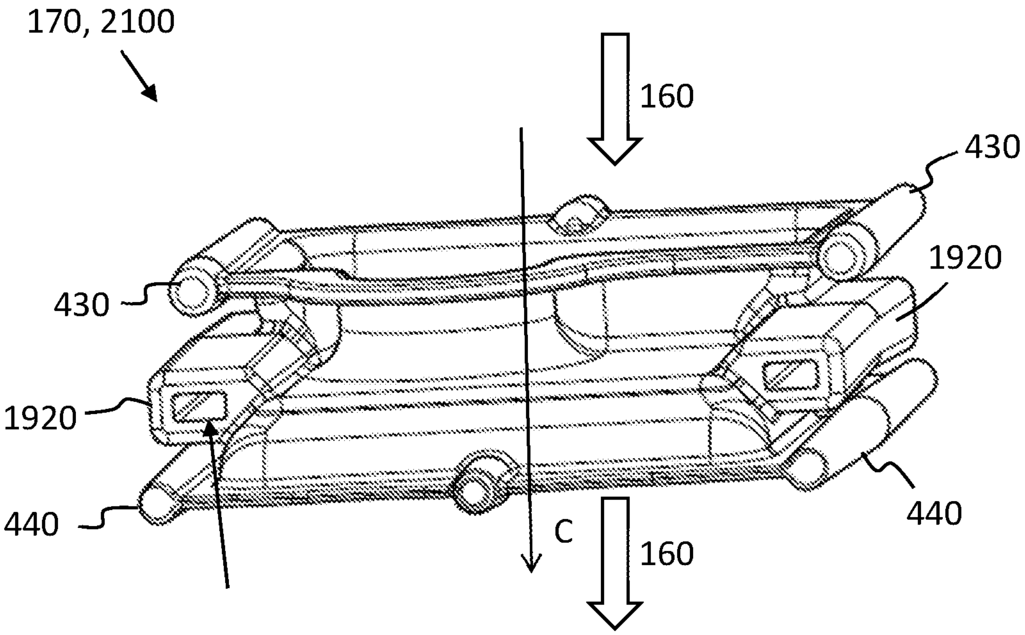
FIG. 21 shows an example damping member.

The compressibility, associated with the Shore hardness, of the bellows can be adjusted by selecting a type of material to use in the reinforcement elements 1920 or by dimensioning thickness of the material used in the elements and in the bellows in order to obtain a desired damping ratio of the damped mass-spring system comprising the first part and the second part. The compressibility can also be adjusted by arranging one or more cavities 1930 in the reinforcement elements 1920 as shown in FIG. 21. According to aspects, a bellows 2100 is arranged in-between the first 110 and the second 120 parts, where the bellows 2100 is associated with a Shore durometer value, or Shore hardness, between 50-100, and preferably between 65-90, measured with durometer type A according to DIN ISO 7619-1. Thus, it is appreciated that the Shore hardness and also material thickness of a bellows such as that illustrated in FIG. 4 and/or in FIG. 21 can be adjusted to mitigate the occurrence of oval shaped cutting discs in a hand-held electrically powered cut-off tool, either by the introduction of a damping coefficient in the mass-spring system to suppress oscillation, or by introducing a limitation of the stroke length to interfere with oscillation, or both.

Figure 22:
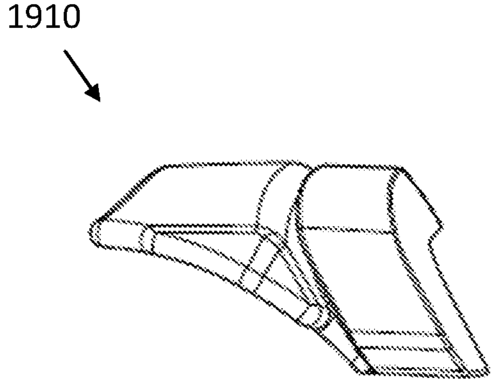
FIG. 22 shows another example damping member.

According to another example, as also shown in FIG. 20, at least one damping member 1910 is fixedly attached to one of the first part 110 or to the second part 120 and arranged distanced from the other of the first part 110 or the second part 120. Thus, the at least one damping member 1910 is arranged to limit a stroke length associated with a relative motion of the first part 110 relative to the second part 120. This damping member has a function similar to that of the reinforcement elements 1920 discussed above in connection to FIG. 21. It is located to limit a stroke length of an oscillating motion between the first and the second parts, and therefore interferes with any oscillating behavior of the first part 110 relative to the second part 120. A more detailed view of the damping member 1910 is shown in FIG. 22. According to this example, it is integrally formed in a single piece of resilient material and mounted onto the body of the first part 110 or the second part 120.

Alternatively, the damping member 1910, or some other resilient element, can be attached to both the first part 110 and to the second part 120, thus forming a resilient bridge between the parts. Since the damping member is associated with a damping coefficient, the damping ratio of the resulting damped mass-spring system will be affected by the addition of such a damping member, and the tendency for oval shaped cutting discs can be mitigated.

Due to the reduced cutting disc speeds which can now be maintained without risk of getting oval shaped cutting discs, electric kickback protection mechanisms can be implemented with advantage. This is because kickback protection mechanisms based on braking by the electric motor 140 may not be effective at very high cutting disc speeds. Thus, according to some aspects, the electric motor 140 is arranged to be controlled by a control unit of the cut-off tool via a motor control interface. The control unit is arranged to obtain data indicative of an angular velocity of the cutting disc 130, and to detect a kickback condition based on a decrease in angular velocity. The control unit is also arranged to control an electromagnetic braking of the electric motor 140 in response to detecting a kickback condition.

To provide a kickback mitigation function which is suitable also for high powered cut-off tools associated with significant tool inertia, that responds fast enough and with sufficient braking force, there is disclosed herein a hand-held electrically powered cut-off tool for cutting concrete and stone by a rotatable cutting disc 130. The cut-off tool comprises an electric motor 140 arranged to be controlled by a control unit via a motor control interface. The control unit is arranged to obtain data indicative of an angular velocity of the cutting disc 130, and to detect a kickback condition based on a decrease in angular velocity. The control unit is also arranged to control electromagnetic braking of the electric motor 140 in response to detecting a kickback condition, and optionally also to actively regulate an energy outtake from the electric motor over the control interface during the electromagnetic braking.

The detection mechanism is based on monitoring the angular velocity of the cutting disc 130. If an abrupt decrease in velocity is seen, such as a high level of retardation in electric rotor angle or cutting disc angle, a kickback condition is detected. Immediately after a kickback event has been detected by the control unit, the electric motor is forcefully braked in order to mitigate the effects of the kickback event. This braking involves an active control of the energy outtake from the electric motor in order to provide a strong braking force without damaging the electrical components of the cut-off tool. This braking is facilitated by the fact that the cutting disc is operated at speeds below 3500 rpm, say at 3200 rpm, which is made possible by the presence of the damping members.

The kickback detection and braking of the cutting disc is often so rapid as to stop the blade before it even leaves the object which is processed. Even if some kickback motion occurs, the energy transferred from the cutting disc 130 to the machine body will be reduced to a level as to mitigate the harmful effects of the kickback event. Notably, the electric motor is not just disconnected from the power source as in many of the prior art documents. Rather, the energy outtake from the electric motor is actively regulated to provide a strong enough braking action to halt the kickback event.

Figure 23:
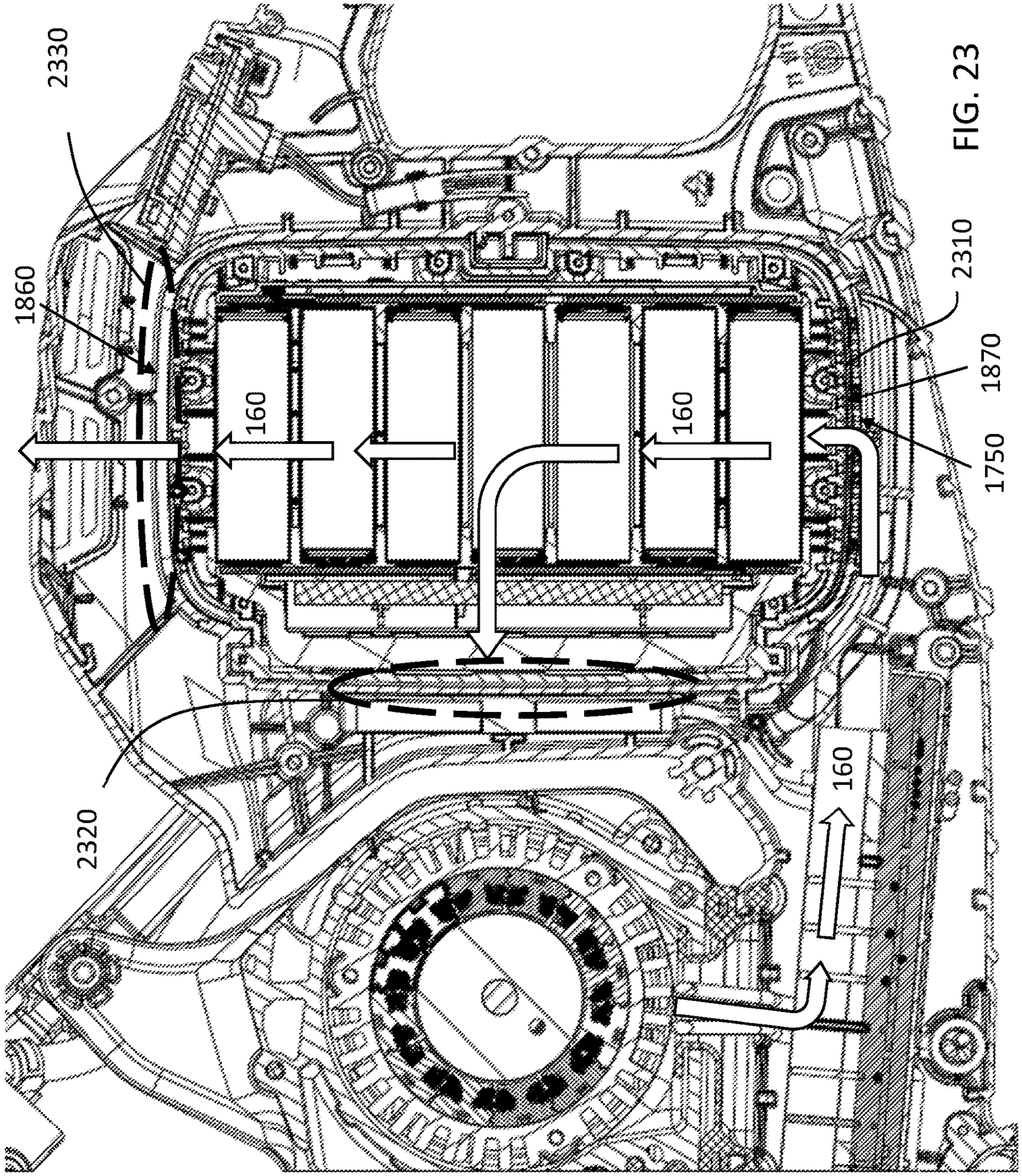
FIG. 23 illustrates a flow of cooling air through parts of a cut-off tool.
Figure 24:
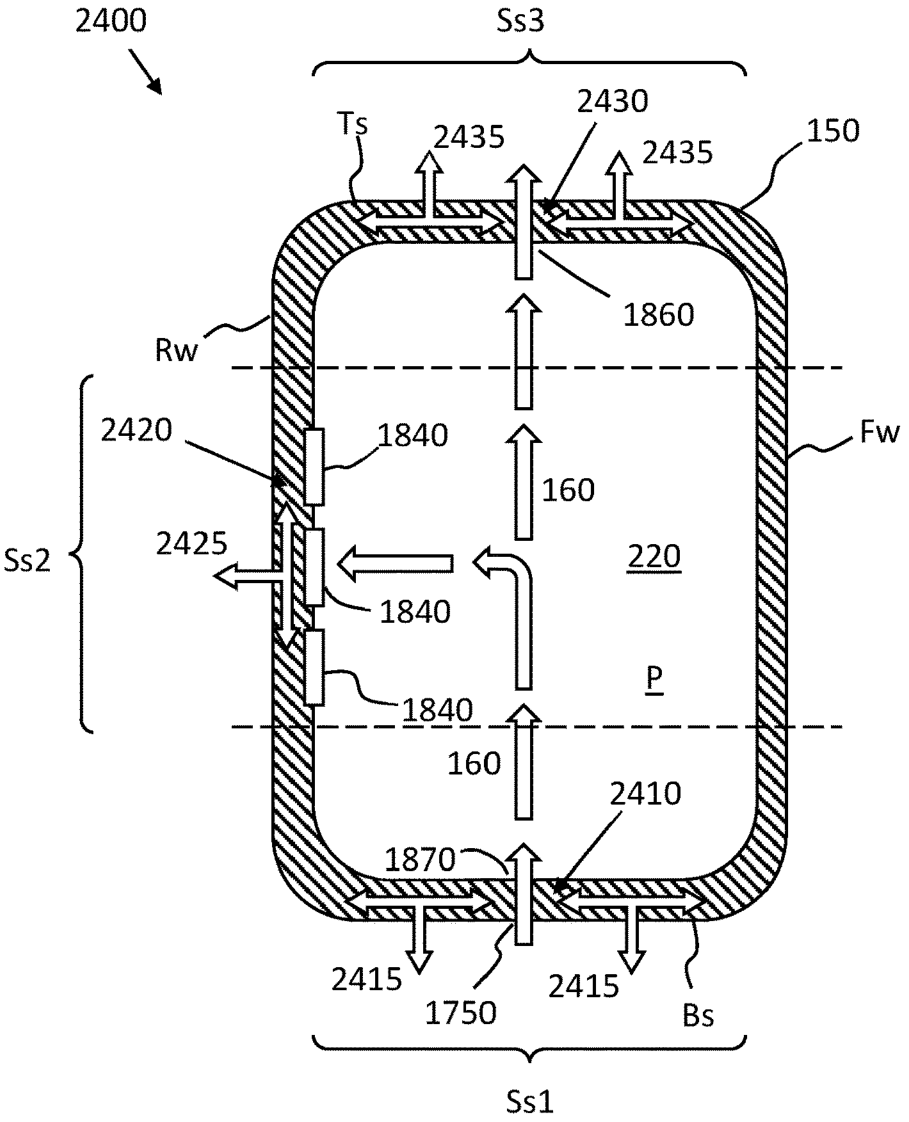
FIG. 24 schematically illustrates a flow of cooling air.

With reference also to FIG. 1, FIG. 23 illustrates details of a hand-held electrically powered cut-off tool 2300 comprising a fan 145 arranged to be driven by an electric motor 140 to generate a flow of cooling air 160 and a battery compartment 150 comprising an electrical storage device 220, 1800, such as a battery, arranged to power the electric motor 140. A cooling air conduit is arranged to guide the flow of cooling air 160 towards an outlet aperture 1750 (seen, e.g., in FIG. 17B) formed in a wall of the battery compartment 150. The outlet aperture 1750 faces a corresponding inlet aperture 1870 formed in an enclosure of the electrical storage device 220, 1800 for receiving cooling air and thereby generating an air pressure above atmospheric pressure in the electrical storage device 220, 1800. With reference to FIG. 24 which illustrates the cooling flow more schematically, a first slot section Ss1 is formed by a distance between the outlet aperture 1750 and the inlet aperture 1870 on the electrical storage device 220, such that a first portion 2415 of the flow of cooling air 160 air leaks out to an exterior of the cut-off tool via the first slot section Ss1.

This first portion 2415 of the flow of cooling air 160 generates an air pressure inside the first slot section which must be overcome by dirt and slurry entering the slot between the electrical storage device 220 and the compartment wall. Thus, dirt and slurry are prevented from entering into the slot, and the battery compartment is kept clean, which is an advantage. A clean battery compartment without accumulated dust and slurry simplifies insertion and removal of the electrical storage device 220 from the tool.

The first portion 2415 of the flow of cooling air is directed transversally to the general flow of cooling air 160 entering the electrical storage device 220, 1800. It may furthermore leak out on both sides of the cut-off-tool, i.e., from both sides of the battery compartment through-hole.

According to an example, the first slot section Ss1 is delimited on one side by a guiding means that guides the electrical storage device 220 into the compartment. The first slot section Ss1 may also be delimited by the supporting heel 1710. It is, however, noted that the slot sections Ss1, Ss2, and Ss3 may be connected to each other or delimited by other delimiters.

According to aspects, the distance between the electrical storage device 220, 1800 and the wall of the battery compartment 150 is between 0.5 mm and 2.0 mm, and preferably about 1.0 mm. This distance may vary around the electrical storage device 220.

The electrical storage device 220, 1800 may further comprise one or more electrical connectors 1840 arranged to mate with corresponding contact strips 1740 arranged in the battery compartment 150. An example of these electrical connectors is seen more clearly in FIG. 18C. An opening in the enclosure of the electrical storage device 220, 1800 is formed in connection to the electrical connectors 1840 such that a second portion 2425 of the flow of cooling air leaks out to an exterior of the cut-off tool through the opening and via a second slot section Ss2 formed between the electrical storage device 220, 1800 and the wall of the battery compartment 150. Thus, since the battery housing is not hermetically sealed around the electrical connectors 1840, the over pressure of cooling air inside the electrical storage device 220 generates a flow of air which exits via the electrical connectors and passes via the second slot section. Again, this flow of air exiting the machine via the slot must be overcome by dirt and slurry if it is to enter into the slot. This is unlikely since the leakage is of considerable flow relative to the more diffuse motion of the dust and slurry generated by the cutting operation. The electrical connectors are therefore kept clean and free of slurry during operation, which is an advantage, in particular since it becomes more easy to insert and to remove the electrical storage device 220 if the connectors and guiding means are clean. The second slot section Ss2 may, e.g., be delimited by the upper ridge structure 1820 and the lower ridge structure 1830 shown in FIG. 18C.

Finally, an air outlet 1860 may also be formed in the electrical storage device enclosure opposite to the inlet aperture 1870 to form a passage for cooling air to flow through the electrical storage device. A third slot section Ss3 can be formed by a distance between the air outlet 1860 and the wall of the battery compartment 150, such that a third portion 2435 of the flow of cooling air 160 leaks out to an exterior of the cut-off tool via the third slot section Ss3. This third slot section also provides a passage for cooling air to leak out via the slot, thereby keeping the space between the electrical energy device 220 top part and the battery compartment wall clean and free from dust and slurry.

Figure 25:
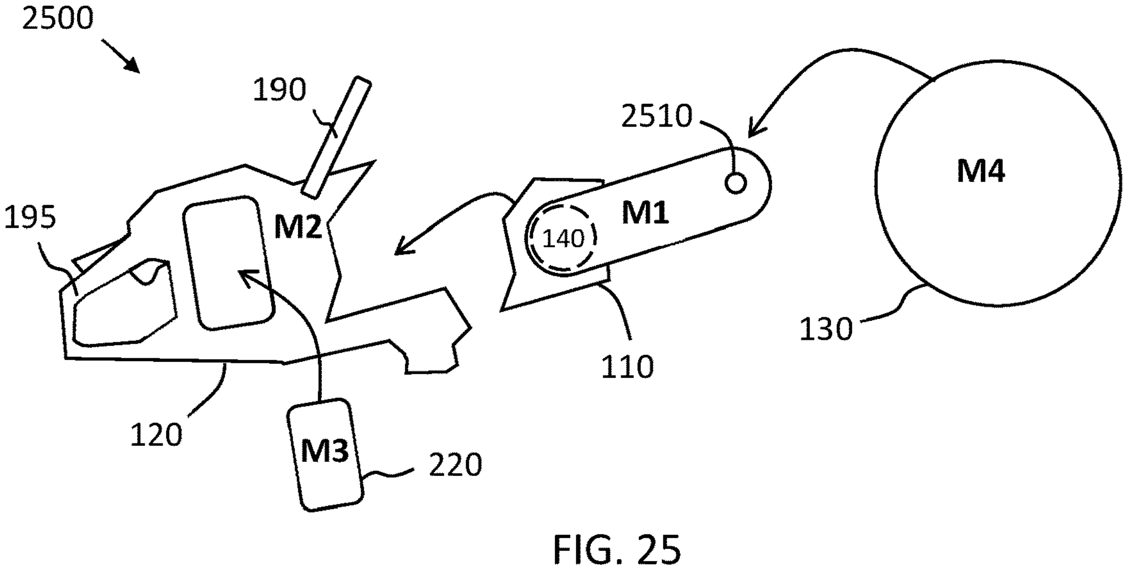
FIG. 25 schematically illustrates a mass distribution of a work tool.

FIG. 25 schematically illustrates a mass distribution of a work tool such as the cut-off tools discussed above in connection to FIGS. 1-24. It has been found that the weight distribution between parts of hand-held electrically powered cut-off tools comprising first and second parts arranged vibrationally isolated from each other can be optimized in order to obtain a more efficient cutting operation and at the same time a reduced operator discomfort due to vibrations propagating from the machine and to the operator via the handles.

De-vibrated petrol fueled cut-off tools are known, i.e., combustion engine powered tools. However, these known tools have sub-optimal weight distributions between the handle part and the part comprising the combustion engine and the cutting disc. Some known petrol powered cut-off machines have handle portions weighting about 2600 g with empty fuel tank and 3500 g with full tank compared to the motor and arm portion which weighs about 7550 g, i.e., an empty tank ratio of 2600 g/10150 g (which amounts to about 0.25), and 3500 g/11050 g with a full tank (which is about 0.32). The ratio with full tank can be compared to the case with a battery (mass M3) fitted in mass M2, i.e., M2+M3, while the case with empty tank can be compared to the case without battery, i.e., only M2.

It is an advantage if the part with the handles, i.e., the masses M2 and M3 in FIG. 25, is of a sufficient weight to withstand vibration propagating via the damping elements and the resilient elements discussed above. However, the part with the cutting blade, i.e., masses M1 and M4, cannot be too light in relation to the handle part, since this would result in an unbalanced tool.

It has been found by extensive experimentation and computer analysis that a ratio of the second mass M2 to the sum of the first and second masses M1+M2 should preferably be at least 0.3 and preferably more than 0.35, i.e., the second mass should make up a considerable part of the total mass of the cut-off tool without cutting disc and electrical storage device mounted. The ratio M2/(M1+M2) can, for example, be about 0.38 for a 12 inch blade device and about 0.37 for a 14 inch blade device. The second mass M2 should, however, not be too large in relation to the first mass. Hence, the ratio of the second mass M2 to the sum of the first and second masses M1+M2 should preferably be below about 0.5 and preferably below about 0.6.

It has also been found that a ratio of a sum of the second and the third mass (i.e., M2+M3) to the sum of the first and fourth masses (M1+M4) should be at least 0.6, and preferably above 0.8 and even more preferably more than 1.0. These ratios provide a well-balanced tool with excellent antivibration capability.

It has also been found that a ratio of a sum of the second and the third mass (M2+M3) to the sum of the weight of the entire device including electrical energy storage and cutting disc (i.e., M1+M2+M3+M4) should be at least 0.45, and preferably more than 0.5. This ratio provides a stable tool with good anti-vibration characteristics.

To summarize, there has been disclosed herein a hand-held electrically powered cut-off tool 100, 200, 800, 1000, 1900, 2500 comprising a first part 110 and a second part 120 arranged vibrationally isolated from each other, the first part 110 comprising an interface 2510 for holding a cutting tool 130 and an electric motor 140 arranged to drive the cutting tool, wherein the first part is associated with a first mass M1, the second part 120 comprising a battery compartment 150 for holding an electrical storage device 220 arranged to power the electric motor 140 as well as front 190 and rear 195 handles for operating the cut-off tool, wherein the second part is associated with a second mass M2, wherein a ratio of the second mass M2 to the sum of the first and second masses M1+M2 is at least 0.3, and preferably more than 0.35.

There has also been disclosed herein a hand-held electrically powered cut-off tool 100, 200, 800, 1000, 1900, 2500 comprising a first part 110 and a second part 120 arranged vibrationally isolated from each other, a cutting tool 130 and an electrical storage device 220, the first part 110 comprising an interface 2510 for holding the cutting tool 130 and an electric motor 140 arranged to drive the cutting tool, wherein the first part is associated with a first mass M1 and wherein the cutting tool is associated with a fourth mass M4, the second part 120 comprising a battery compartment 150 for holding the electrical storage device 220 arranged to power the electric motor 140 as well as front 190 and rear 195 handles for operating the cut-off tool, wherein the second part is associated with a second mass M2 and wherein the electrical storage device 220 is associated with a third mass M3, wherein a ratio of a sum of the second and the third mass M2+M3 to the sum of the first and fourth masses M1+M4 is at least 0.6, and preferably more than 0.8 and even more preferably more than 1.0.

There has furthermore been disclosed herein a hand-held electrically powered cut-off tool 100, 200, 800, 1000, 1900, 2500 comprising a first part 110 and a second part 120 arranged vibrationally isolated from each other, a cutting tool 130 and an electrical storage device 220, the first part 110 comprising an interface 2510 for holding the cutting tool 130 and an electric motor 140 arranged to drive the cutting tool, wherein the first part is associated with a first mass M1 and wherein the cutting tool is associated with a fourth mass M4, the second part 120 comprising a battery compartment 150 for holding the electrical storage device 220 arranged to power the electric motor 140 as well as front 190 and rear 195 handles for operating the cut-off tool, wherein the second part is associated with a second mass M2 and wherein the electrical storage device 220 is associated with a third mass M3, wherein a ratio of a sum of the second and the third mass (M2+M3) to the sum of the weight of the entire device including electrical energy storage and cutting disc (M1+M2+M3+M4), is at least 0.45, and preferably more than 0.5.

The table below provides an example weight distribution which may be used with advantage together with the hand-held electrically powered cut-off tools discussed herein. Examples for two different sizes of battery have been included in the table, a large battery weighting about 5100 g (denoted M32) and a smaller battery weighting about 3000 g (denoted M31).

| Part weight examples | 12 inch blade | 14 inch blade |
|---|---|---|
| M1 | 4500 g | 4720 g |
| M2 | 2750 g | 2750 g |
| M31 - small battery | 3000 g | 3000 g |
| M32 - large battery | 5100 g | 5100 g |
| M4 | 1250 g | 1850 g |
| Relations | | |
| M2/(M2 + M1) | ~0.38 | ~0.37 |
| (M2 + M31)/(M1 + M4) | ~1.0 | ~0.88 |
| (M2 + M32)/(M1 + M4) | ~1.37 | ~1.19 |
| (M2 + M31)/(M1 + M2 + M31 + M4) | 0.5 | ~0.47 |
| (M2 + M32)/(M1 + M2 + M32 + M4) | ~0.58 | ~0.54 |

The invention claimed is:

1. A hand-held electrically powered cut-off tool comprising a first part and a second part arranged vibrationally isolated from each other,
   - the first part comprising an interface for holding a cutting tool and an electric motor arranged to drive the cutting tool, wherein the first part is associated with a first mass,
   - the second part comprising a battery compartment for holding an electrical storage device arranged to power the electric motor as well as front and rear handles for operating the cut-off tool, wherein the second part is associated with a second mass,
   - wherein a ratio of the second mass to the sum of the first and second masses is at least 0.3.

2. The hand-held electrically powered cut-off tool according to claim 1, further comprising a battery arranged to be inserted into the battery compartment of the hand-held cut-off tool, wherein the battery has a weight between 3-7 kg, and comprises a groove arranged on one side of the battery to mate with a corresponding supporting heel arranged on a wall of a battery compartment, the battery further comprising an upper ridge structure and a lower ridge structure arranged on an opposite side of the battery compared to the groove, wherein the upper and lower ridge structures are arranged to mate with corresponding grooves of the battery compartment.

3. The hand-held electrically powered cut-off tool according to claim 1, wherein the first mass is between 4000-5000 g.

4. The hand-held electrically powered cut-off tool according to claim 1, wherein the second mass is between 2500-3500 g.

5. A hand-held electrically powered cut-off tool comprising a first part and a second part arranged vibrationally isolated from each other, a cutting tool and an electrical storage device,
   - the first part comprising an interface for holding the cutting tool and an electric motor arranged to drive the cutting tool, wherein the first part is associated with a first mass and wherein the cutting tool is associated with a fourth mass,
   - the second part comprising a battery compartment for holding the electrical storage device arranged to power the electric motor as well as front and rear handles for operating the cut-off tool, wherein the second part is associated with a second mass and wherein the electrical storage device is associated with a third mass,
   - wherein a ratio of a sum of the second and the third mass to a sum of the first and fourth masses is at least 0.6.

6. The hand-held electrically powered cut-off tool according to claim 5, further comprising the electrical storage device arranged to be inserted into the battery compartment of the hand-held cut-off tool, wherein the electrical storage device has a weight between 3-7 kg, and comprises a groove arranged on one side of the electrical storage device to mate with a corresponding supporting heel arranged on a wall of a battery compartment, the battery further comprising an upper ridge structure and a lower ridge structure arranged on an opposite side of the electrical storage device compared to the groove, wherein the upper and lower ridge structures are arranged to mate with corresponding grooves of the battery compartment.

7. The hand-held electrically powered cut-off tool according to claim 5, wherein the first mass is between 4000-5000 g.

8. The hand-held electrically powered cut-off tool according to claim 5, wherein the second mass is between 2500-3500 g.

9. A hand-held electrically powered cut-off tool comprising a first part and a second part arranged vibrationally isolated from each other, a cutting tool and an electrical storage device,
   - the first part comprising an interface for holding the cutting tool and an electric motor arranged to drive the cutting tool, wherein the first part is associated with a first mass and wherein the cutting tool is associated with a fourth mass,
   - the second part comprising a battery compartment for holding the electrical storage device arranged to power the electric motor as well as front and rear handles for operating the cut-off tool, wherein the second part is associated with a second mass and wherein the electrical storage device is associated with a third mass,
   - wherein a ratio of a sum of the second and the third mass to a sum of the weight of the entire device including electrical energy storage and cutting tool, is at least 0.5.

10. The hand-held electrically powered cut-off tool according to claim 9, further comprising the electrical storage device arranged to be inserted into the battery compartment of the hand-held cut-off tool, wherein the electrical storage device has a weight between 3-7 kg, and comprises a groove arranged on one side of the battery to mate with a corresponding supporting heel arranged on a wall of a battery compartment, the battery further comprising an upper ridge structure and a lower ridge structure arranged on an opposite side of the electrical storage device compared to the groove, wherein the ridge structures are arranged to mate with corresponding grooves of the battery compartment.

11. The hand-held electrically powered cut-off tool according to claim 9, wherein the first mass is between 4000-5000 g.

12. The hand-held electrically powered cut-off tool according to claim 9, wherein the second mass is between 2500-3500 g.

* * * * *